US006681269B2

(12) United States Patent
Hirabayashi et al.

(10) Patent No.: US 6,681,269 B2
(45) Date of Patent: *Jan. 20, 2004

(54) DATA PROCESSING APPARATUS, EXTERNAL STORAGE APPARATUS, DATA PROCESSING SYSTEM AND DATA TRANSMITTING METHOD

(75) Inventors: Mitsuhiro Hirabayashi, Tokyo (JP); Kenichi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/302,048

(22) Filed: Nov. 22, 2002

(65) Prior Publication Data

US 2003/0074497 A1 Apr. 17, 2003

Related U.S. Application Data

(63) Continuation of application No. 10/106,672, filed on Mar. 25, 2002, now Pat. No. 6,496,879, which is a continuation of application No. 09/626,281, filed on Jul. 25, 2000, now Pat. No. 6,412,023, which is a continuation of application No. 09/083,213, filed on May 21, 1998, now Pat. No. 6,253,259.

(30) Foreign Application Priority Data

Jun. 4, 1997 (JP) .............................. 9-146916
Jul. 31, 1997 (JP) .............................. 9-206929

(51) Int. Cl.[7] ........................... G06F 13/00; G06F 13/14

(52) U.S. Cl. ............................ 710/33; 710/5; 710/18; 710/19; 710/33; 710/38; 709/217; 711/145

(58) Field of Search ............................ 710/5, 18, 19, 710/33, 38; 709/217; 711/145

(56) References Cited

U.S. PATENT DOCUMENTS

| 4,490,784 A | * 12/1984 | Ives et al. ...................... 710/5 |
| 4,683,530 A | 7/1987 | Quatse |
| 5,202,884 A | 4/1993 | Close et al. |
| 5,390,350 A | 2/1995 | Chung et al. |

(List continued on next page.)

FOREIGN PATENT DOCUMENTS

| EP | 0 589 499 | 3/1994 |
| JP | 02132514 | 5/1990 |
| JP | 05173907 | 7/1993 |
| JP | 07302176 | 11/1995 |
| JP | 09055737 | 2/1997 |
| WO | WO 96 37851 | 11/1996 |

OTHER PUBLICATIONS

Anonymous: "OROS Reference Manual" 'Online! Mar. 1997, GEMPLUS, 13881 GEMENOS CEDEX, France XP002226435 Retrieved from the Internet: <URL: http://www.linuxnet.com/documentation/files/e5225050.pdf>'retrieved on Jan. 7, 2003.

Primary Examiner—Rehana Perveen
(74) Attorney, Agent, or Firm—Frommer Lawrence & Haug LLP; William S. Frommer

(57) ABSTRACT

A data processing apparatus and an external storage apparatus arranged to transmit data by using serial signals and capable of reducing the number of signal lines for use to transmit serial data. A CLK line, a control line and a DT line are arranged between a data processing apparatus and a memory card. The DT line is a line through which data and commands formed into serial signals are bidirectionally transmitted. A synchronizing signal is transmitted to the CLK line. A control signal is supplied from the data processing apparatus to the memory card through the control line. In a period of time in which the signal level of the control signal is a high level, data or a command is transmitted to the DT line. In a period of time in which the signal level of the control signal is a low level, a status signal is transmitted to the DT line from the memory card.

17 Claims, 12 Drawing Sheets

U.S. PATENT DOCUMENTS

| | | |
|---|---|---|
| 5,408,678 A | 4/1995 | Kato et al. |
| 5,418,785 A | 5/1995 | Olshansky et al. |
| 5,430,684 A | 7/1995 | Kim et al. |
| 5,442,472 A | 8/1995 | Skrobko |
| 5,497,362 A | 3/1996 | Aizawa |
| 5,627,730 A | 5/1997 | Konig et al. |
| 5,680,443 A | 10/1997 | Kasday et al. |
| 5,790,786 A | 8/1998 | Wakeman et al. |
| 5,822,508 A | 10/1998 | Ohara |
| 5,847,741 A | 12/1998 | Lee |
| 5,961,624 A | 10/1999 | Takayama |
| 6,219,695 B1 | 4/2001 | Guttag et al. |

* cited by examiner

DATA PROCESSING APPARATUS, EXTERNAL STORAGE APPARATUS, DATA PROCESSING SYSTEM AND DATA TRANSMITTING METHOD

This is a continuation of application Ser. No. 10/106,672, filed Mar. 25, 2002 now U.S. Pat. No. 6,496,879, which is a continuation of application Ser. No. 09/626,281, filed Jul. 25, 2000, now U.S. Pat. No. 6,412,023, which is a continuation of Ser. No. 09/083,213, filed May 21, 1998, now U.S. Pat. No. 6,253,259.

BACKGROUND OF THE INVENTION

1. Field of the Invention

The present invention relates to a data processing apparatus, a data processing system and a data transmitting method for communicating data to an external storage apparatus by using a serial interface, and to an external storage apparatus adaptable to the data processing apparatus, the data processing system and the data transmitting method.

2. Related Background Art

Hitherto, a data processing apparatus, to which a memory card including a storage medium, such as a flush memory, is connected, has been known. A conventional data processing apparatus of the foregoing type and a memory card arranged to be connected to the data processing apparatus will now be described with reference to the drawings.

As shown in FIG. 1, a data processing apparatus 100 includes a data processing block 101, a register 102, a host side serial interface circuit 103 and a host side controller 104. The memory card 110 includes a memory 111, a register 112, a card side serial interface circuit 113 and a card side controller 114.

The data processing block 101 of the data processing apparatus 100 reads data stored on the memory card 110 to subject read data to a variety of processes. Moreover, the data processing block 101 performs the variety of the data processes to generate data which will be written on the memory card 110. That is, the data processing block 101 serves as a data processing circuit for a variety of apparatuses of a type which uses the memory card 110.

The register 102 is a buffer between the data processing block 101 and the host side serial interface circuit 103. That is, when data is supplied from the data processing block 101 to the host side serial interface circuit 103, the data processing apparatus 100 temporarily stores data on the register 102, and then supplies data to the host side serial interface circuit 103. Similarly, the data processing apparatus 100 temporarily stores data in the register 102, and then supplies data to the data processing block 101 when data is supplied from the host side serial interface circuit 103 to the data processing block 101.

The host side serial interface circuit 103 converts data supplied from the data processing block 101 through the register 102 and a command supplied from the card side controller 114 into serial signals so as to supply the serial signals to the memory card 110. Moreover, the host side serial interface circuit 103 converts data of the serial signal and the command supplied from the memory card 110 into parallel signals so as to supply the parallel signals to the data processing block 101 and the card side controller 114.

The host side serial interface circuit 103 supplies a synchronizing signal (CLK) of data and the command and a chip-selection signal (CS) to the memory card 110. The host side serial interface circuit 103 acquires a busy signal (BUSY) and an interrupt signal (INTERRUPT) supplied from the memory card 110.

The host side controller 104 controls the data processing operation which is performed by the data processing block 101 and a data transmitting operation which is performed by the host side serial interface circuit 103. The host side controller 104 supplies a command, which is a control command for the memory card 110, to the memory card 110 through the register 112.

On the other hand, the memory 111 of the memory card 110 includes, for example, a flush memory, on which data supplied from the data processing block 101 is stored.

The register 112 is a buffer between the memory 111 and the card side serial interface circuit 113. That is, the memory card 110 temporarily stores data on the register 102, and then supplies data, which must be written, to the memory 111 when data supplied from the data processing apparatus 100 is written on the memory 111. Similarly, the memory card 110 temporarily stores data on the register 102, and then supplies data, which must be read, to the card side serial interface circuit 113 when the data processing apparatus 100 reads data from the memory 111. That is, the register 112 is a circuit having a function to serve as a page buffer for the flush memory.

The card side serial interface circuit 113 is controlled by the card side controller 114 in such a manner as to convert data of the parallel signal supplied from the memory 111 and the command supplied from the card side controller 114 into serial signals so as to supply the serial signals to the data processing apparatus 100. The card side serial interface circuit 113 converts data of the serial signal and the command supplied from the data processing apparatus 100 into parallel signals so as to supply the parallel signals to the memory 111 and the card side controller 114.

The card side serial interface circuit 113 acquires the synchronizing signal (CLK) of data and the command and the chip-selection signal (CS) from the data processing apparatus 100. The card side serial interface circuit 113 supplies the busy signal (BUSY) and the interrupt signal (INTERRUPT) to the data processing apparatus 100.

The card side controller 114 controls data storage, reading and erasing operations which are performed by the memory 111 in accordance with a command or the like supplied from the data processing apparatus 100. The card side controller 114 controls the data transmitting operation which is performed by the card side serial interface circuit 113. The host side controller 104 acquires, from the memory card 110, the busy signal and the interrupt signal which serve as status signals for the memory card 110.

An operation for transmitting data between the data processing apparatus 100 and the memory card 110 is performed through a transmission line arranged between the host side serial interface circuit 103 and the card side serial interface circuit 113.

Between the card side serial interface circuit 113 of the data processing apparatus 100 and the card side serial interface circuit 113 of the memory card 110, there are arranged five signal lines consisting of a CLK line, a CS line, a DT line, a BUSY line and an INT line.

The DT line is supplied with main data, that is, data processed by the data processing block 101 so as to be written on the memory 111 and data which must be written from the memory 111 so as to be supplied to the data processing block 101. Moreover, a command which is supplied from the data processing apparatus 100 to the memory card 110 and which serves as a control command and a command which is supplied from the memory card 110 to the data processing apparatus 100 are transmitted to the DT line. That is, main data and the command formed into serial signals are bidirectionally transmitted to the DT line.

A synchronizing signal of main data and the commands which are transmitted to the DT line is supplied from the data processing apparatus 100 to the memory card 110 through the CLK line.

The so-called chip select signal is supplied from the data processing apparatus 100 to the memory card 110 through the CS line. In a period of time in which the level of the chip select signal is high, a fact is indicated that main data, the commands and the synchronizing signals are effective.

The busy signal indicating that the memory card 110 is performing a process is transmitted to the BUSY line. When the memory card 110 is performing, for example, a writing process and an access which is made from the data processing apparatus 100 is inhibited, the busy signal is supplied from the memory card 110 to the data processing apparatus 100.

The interrupt signal indicating an interruption from the memory card 110 to the data processing apparatus 100 is supplied from the memory card 110 to the data processing apparatus 100 through the INT line.

The variety of the signals are transmitted through the above-mentioned transmitting lines in accordance with a time chart arranged as shown in FIG. 2. With reference to the time chart shown in FIG. 2, a process for reading data stored in the memory card 110 will now be described.

At time $t_{11}$, the data processing apparatus 100 supplies the chip select signal to the memory card 110 through the CS line. In addition to the chip select signal, the data processing apparatus 100 supplies the synchronizing signal through the CLK line. When the memory card 110 has acquired the chip select signal, the memory card 110 prepares for acquiring a command which will be supplied from the data processing apparatus 100. When the data processing apparatus 100 has supplied the chip select signal, the data processing apparatus 100 supplies a reading command and its address to the memory card 110 through the DT line.

After the data processing apparatus 100 has supplied the reading command and the like, the data processing apparatus 100 interrupts the operation for supplying the command and the synchronizing signal at time $t_{12}$. After the memory card 110 has acquired the command, the memory card 110 supplies the busy signal to the data processing apparatus 100 in order to perform the control in accordance with the supplied command. That is, the memory card 110 performs control to read main data at an instructed address from the memory 111 so as to supply main data to the register 112. At this time, the data processing apparatus 100 does not interrupt supply of the chip select signal.

When the memory card 110 has read and supplied main data to the register 112, the memory card 110 interrupts supply of the busy signal at time $t_{13}$. That is, the memory card 110 communicates, to the data processing apparatus 100, a ready state in which a preparation for transmitting main data has been completed.

After the data processing apparatus 100 has detected interruption of supply of the busy signal, the data processing apparatus 100 makes a determination that the control which is performed in accordance with the command supplied from the memory card 110 has been completed. Thus, the data processing apparatus 100 supplies a synchronizing signal to the memory card 110 at time $t_{14}$. Then, the memory card 110 transmits main data to the data processing apparatus 100 through the DT line.

After the memory card 110 has completed transmission of main data, the data processing apparatus 100 interrupts supply of the synchronizing signal and the chip select signal at time $t_{15}$.

If the reading process and the like have changed the internal state of the memory card 110, at time $t_{16}$, the memory card 110 supplies the interrupt signal indicating interruption to the data processing apparatus 100 through the INT line. When the interrupt signal has been supplied to the data processing apparatus 100, the data processing apparatus 100 supplies a predetermined command and the chip select signal to the memory card 110 in order to acquire a cause of this interruption from the memory card 110.

As described above, the data processing apparatus 100 has the DT line for transmitting main data and the commands, the CLK line for supplying the synchronizing signal, the CS line for supplying the chip select signal, the BUSY line for acquiring the busy signal and the INT line for acquiring the interrupt signal so as to communicate data to and from the memory card 110.

When size reduction of the memory card 110 which is the external storage apparatus is attempted, the number of signal lines arranged between the data processing apparatus 100 and the memory card 110 must be reduced.

SUMMARY OF THE INVENTION

In view of the foregoing, an object of the present invention is to provide a data processing apparatus, an external storage apparatus, a data processing system and an external storage apparatus for use in the data transmitting method arranged to transmit data by using serial signals and capable of reducing the number of signal lines for transmitting serial data.

To achieve the above-mentioned object, according to one aspect of the present invention, there is provided a data processing apparatus including: a serial signal I/O block for communicating data to an external storage apparatus by using serial signals; a control signal output block for supplying, to the external storage apparatus, a control signal for controlling transmitting timing of data which is transmitted by the serial signal I/O block; and a synchronizing signal output block for supplying, to the external storage apparatus, a synchronizing signal of data which is transmitted by the serial signal I/O block, wherein the serial signal I/O block transmits data in a period of time in which the control signal output block supplies the control signal to the external storage apparatus and acquires a status signal indicating a state of the operation of the external storage apparatus from the external storage apparatus in a period of time in which the control signal is not supplied from the control signal output block to the external storage apparatus.

The data processing apparatus has the structure that the serial signal I/O block acquires a status signal from the external storage apparatus in a period of time in which the serial signal I/O block does not supply the control signal so as to transmit both of data and the status signal.

According to another aspect of the present invention, there is provided an external storage apparatus including: a serial signal I/O block for communicating data to a data processing apparatus by using serial signals; a control signal input block for acquiring, from the data processing apparatus, a control signal for controlling transmitting timing of data which is transmitted by the serial signal I/O block; and a synchronizing signal input block for acquiring, from the data processing apparatus, a synchronizing signal of data which is transmitted by the serial signal I/O block, wherein the serial signal I/O block transmits data in a period of time in which the control signal input block is supplied with the control signal and transmits a status signal indicating a state of the operation of the external storage apparatus in a period of time in which the control signal input block is not supplied with the control signal.

The external storage apparatus has the structure that the serial signal I/O block supplies a status signal to the data processing apparatus in a period of time in which the control signal is not supplied so as to transmit both of data and the status signal.

According to another aspect of the present invention, there is provided a data processing system including: data processing means incorporating a host side serial signal I/O block for communicating data by using serial signals, a control signal output block for transmitting a control signal for controlling transmitting timing of data which is transmitted by the host side serial signal I/O block and data processing means for supplying a synchronizing signal of data which is transmitted by the host side serial signal I/O block; and external storage means incorporating an external serial signal I/O block for communicating data to the host side serial signal I/O block of the data processing means, a control signal input block for acquiring the control signal and a synchronizing signal input block for acquiring the synchronizing signal, wherein the host side serial signal I/O block and the external serial signal I/O block communicate data in a period of time in which the control signal is supplied and the external serial signal I/O block supplies, to the host side serial signal I/O block, a status signal indicating a state of the operation of the external storage means in a period of time in which the control signal is not supplied to the control signal input block.

The data processing system has the structure that the external serial signal I/O block supplies the serial signal to the data processing means in a period of time in which the external serial signal I/O block is not supplied with the control signal and acquires the status signal from the external storage means in a period of time in which the host side serial signal I/O block does not supply the control signal so as to transmit both of data and the status signal.

According to another aspect of the present invention, there is provided a data transmitting method for communicating data between a data processing apparatus and an external storage apparatus for the data processing apparatus, including the steps of: generating a control signal for controlling data transmission timing; transmitting data in response to the control signal generated by the data processing apparatus; and transmitting a status signal indicating a state of the operation of the external storage apparatus in a period of time in which data transmission which is performed in response to the control signal is not performed.

The data transmitting method has the structure that the status signal indicating a state of the operation of the external storage apparatus is transmitted in a period of time in which data is not transmitted in response to the control signal so as to be transmit both of data and the status signal by one transmitting means.

According to another aspect of the present invention, there is provided a data processing apparatus including: a serial signal I/O block for communicating data to an external storage apparatus by using serial signals; a control signal output block for supplying, to the external storage apparatus, a control signal for controlling timing at which data which is transmitted by the serial signal I/O block is switched and supplying the control signal to the external storage apparatus; and a synchronizing signal output block for supplying, to the external storage apparatus, a synchronizing signal of data which is transmitted by the serial signal I/O block, wherein the serial signal I/O block, in response to the control signal, switches the contents of data which is transmitted.

The data processing apparatus has the structure that the contents of data which is transmitted in response to the control signal are switched so that the serial signal I/O block transmits data of a plurality of contents. According to another aspect of the present invention, there is provided an external storage apparatus including: a serial signal I/O block for communicating data to a data processing apparatus by using serial signals; a control signal input block for acquiring, from the data processing apparatus, a control signal for controlling timing at which data which is transmitted by the serial signal I/O block is switched; and a synchronizing signal input block for acquiring, from the data processing apparatus, a synchronizing signal of data which is transmitted by the serial signal I/O block, wherein the serial signal I/O block, in response to the control signal, switches the contents of data which is transmitted.

The external storage apparatus has the structure that the contents of data which is transmitted in response to the control signal are switched so that the serial signal I/O block transmits data of a plurality of contents. According to another aspect of the present invention, there is provided a data processing system including: data processing means incorporating a host side serial signal I/O block for transmitting data by using serial signals, a control signal output block for generating a control signal for controlling timing at which data which is transmitted by the host side serial signal I/O block is switched and a synchronizing signal output block for transmitting a synchronizing signal of data which is transmitted by the host side serial signal I/O block so that the data processing means processes data; and external storage means incorporating an external serial signal I/O block for communicating data to the host side serial signal I/O block, a control signal input block for acquiring the control signal transmitted from the control signal output block, and a synchronizing signal input block for acquiring the synchronizing signal transmitted from the synchronizing signal output block, the external storage means being connected to the data processing means so as to store data which is processed by the data processing means, wherein the host side serial signal I/O block and the external serial signal I/O block switch the contents of data which is transmitted in response to the control signal.

The data processing system has the structure that the contents of data which is transmitted in response to the control signal are switched so that the host side serial signal I/O block and the external serial signal I/O block transmit data of a plurality of contents.

According to another aspect of the present invention, there is provided a data transmitting method including the steps of: causing the data processing apparatus and the external storage apparatus to communicate data by using serial signals; causing the data processing apparatus to generate a control signal for controlling timing at which data which is transmitted is switched and to transmit the control signal to the external storage apparatus; and causing the data processing apparatus and the external storage apparatus to switch the contents of data which is transmitted in response to the control signal.

The data transmitting method according to the present invention has the structure that the contents of data which is transmitted in response to the control signal are switched so that the data processing apparatus and the external storage apparatus transmit data of a plurality of contents by one transmitting means.

According to another aspect of the present invention, there is provided a data processing apparatus including: a serial signal I/O block for performing data communication to an external storage apparatus; a control signal output block for supplying, to the external storage apparatus, a control signal for controlling timing at which data which is communicated to the serial signal I/O block is switched; and a synchronizing signal output block for supplying, to the external storage apparatus, a synchronizing signal of data which is communicated by the serial signal I/O block. The serial signal I/O block performs, by using serial signals, at least transmitting, to an external storage apparatus, data of a control command for controlling the operation of the external storage apparatus, receiving a status signal indicating a state of the operation of the external storage apparatus from the external storage apparatus, transmitting, to the external storage apparatus, data which is written on the external storage apparatus and receiving data read from the external storage apparatus.

The control signal output block makes the signal level of the control signal which is supplied to the external storage apparatus to be a predetermined level in accordance with data which is communicated by the serial signal I/O block. When the serial signal I/O block is receiving the status signal, the serial signal I/O block makes a determination that the status signal is a ready signal indicating a fact that the external storage apparatus is in a state for waiting input of a signal in a case where the status signal is a signal having the signal level which is repeatedly changed at predetermined cycles. In other cases, the serial signal I/O block makes a determination that the status signal is a busy signal indicating a fact that the external storage apparatus is in a state in which the external storage apparatus does not receive an input of a signal.

The data processing apparatus has the structure that the signal level of the control signal which is supplied to the external storage apparatus in accordance with data which is communicated by the serial signal I/O block is made to be a predetermined level. The data processing apparatus has the structure that a determination is made that the status signal is the ready signal if the received status signal is a signal having the signal level which is repeatedly changed at predetermined cycles. In other case, a determination is made that the status signal is the busy signal.

According to another aspect of the present invention, there is provided an external storage apparatus, the operation of which is controlled in accordance with data of a control command supplied from a data processing apparatus, on which data is written and from which data is read by the data processing apparatus, the external storage apparatus including: a serial signal I/O block for communicating data to the data processing apparatus by using serial signals; a control signal input block for receiving, from the data processing apparatus, a control signal for controlling timing at which data which is communicated to the serial signal I/O block is switched; and a synchronizing signal input block for receiving, from the data processing apparatus, a synchronizing signal of data which is communicated to the serial signal I/O block. The serial signal I/O block performs at least receiving data of a control command from the data processing apparatus, transmitting, to the data processing apparatus, a status signal indicating a state of the operation, receiving, from the data processing apparatus, data which is written thereon and transmitting, to the data processing apparatus, data which is read therefrom by using serial signals.

The serial signal I/O block switches the contents of data which is communicated in response to the control signal, and transmits, as a status signal, a ready signal having the signal level which is repeatedly changed at predetermined cycles when the state of the serial signal I/O block has been changed from a state in which the serial signal I/O block does not receive input of a signal from the data processing apparatus to a state in which the serial signal I/O block waits for input of a signal. The serial signal I/O block transmits a busy signal having a constant signal level as a status signal or pauses output of a signal when the external storage apparatus is performing a process in accordance with data of a control command and the external storage apparatus is in a state in which the external storage apparatus does not receive input of a signal from the data processing apparatus, and pauses output of a signal when an error has been made during receipt of data of a control command.

The external storage apparatus according to the present invention switches data which is connected by the serial signal I/O block in response to the control signal supplied from the data processing apparatus. When the external storage apparatus has been changed from a state in which the external storage apparatus does not receive input of a signal from the data processing apparatus to a state in which the external storage apparatus waits for the input of a signal, the external storage apparatus transmits a ready signal as the status signal, the ready signal having the signal level which is repeatedly changed at predetermined cycles. When the external storage apparatus performs a process in accordance with data of a control command and thus the external storage apparatus does not receive the input of a signal from the data processing apparatus, the external storage apparatus transmits, as the status signal, a busy signal having a constant signal level or pauses the output of a signal. When an error has been made in a period in which the external storage apparatus receives data of a control command, the external storage apparatus pauses the output of a signal.

According to the present invention, there is provided a data processing system for communicating data between a data processing apparatus and an external storage apparatus.

In the data processing system, the data processing apparatus incorporates a host side serial signal I/O block for communicating data to the external storage apparatus by using serial signals; a control signal output block for supplying, to the external storage apparatus, a control signal for controlling timing at which data which is communicated by the host side serial signal I/O block is switched; and a synchronizing signal output block for supplying, to the external storage apparatus, a synchronizing signal of data which is communicated by the host side serial signal I/O block. The host side serial signal I/O block performs at least transmitting data of a control command for controlling the operation of the external storage apparatus, receiving a status signal indicating a state of the operation of the external storage apparatus, transmitting data which is written on the external storage apparatus and receiving data which is read from the external storage apparatus by using serial signals.

On the other hand, the external storage apparatus incorporates an external serial signal I/O block for communicating data to the data processing apparatus by using serial signals; a control signal input block for receiving, from the data processing apparatus, a control signal for controlling timing at which data which is communicated by the external serial signal I/O block is switched, and a synchronizing signal input block for receiving, from the data processing apparatus, a synchronizing signal of data which is communicated by the external serial signal I/O block. The external serial signal I/O block performs at least receiving data of the control command, transmitting the status signal, receiving data which is written thereon and transmitting data which is read therefrom to and from the data processing apparatus by using serial signals.

The control signal output block of the data processing system makes the signal level of the control signal to be a predetermined level in accordance with data which is communicated between the host side serial signal I/O block and the external serial signal I/O block. When the state of the external serial signal I/O block has been changed from a state in which the external serial signal I/O block does not receive input of a signal from the data processing apparatus to a state in which the external serial signal I/O block waits for input of a signal, the external serial signal I/O block transmits, as a status signal, a ready signal having the signal level which is repeatedly changed at predetermined cycles. The external serial signal I/O block transmits a busy signal having a constant signal level as a status signal or pauses output of a signal when the external storage apparatus is performing a process in accordance with data of a control command and the external storage apparatus is in a state in which the external storage apparatus does not receive input of a signal from the data processing apparatus, and pauses output of a signal when an error has been made during receipt of data of a control command.

The data processing system has the structure that the signal level of the control signal which is supplied to the external storage apparatus is made to be a predetermined level in accordance with data which is communicated between the host side serial signal I/O block and the external serial signal I/O block. When the external storage apparatus has been changed from a state in which the external storage apparatus does not receive the input of a signal to a state in which the external storage apparatus waits for the input of a signal, the ready signal having the signal level which is repeatedly changed at predetermined cycles is transmitted from the external storage apparatus. When the external storage apparatus is performing a process in accordance with data of the control command and thus the external storage apparatus does not receive the input of a signal, the busy signal having a constant signal level is transmitted as the status signal from the external serial signal I/O block or the output of a signal from the external serial signal I/O block is paused. If an error is made when the external storage apparatus has received data of a control command, the output of a signal from the external serial signal I/O block is paused.

According to another aspect of the present invention, there is provided a data transmitting method for communicating data between a data processing apparatus and an external storage apparatus.

In the data transmitting method according to the present invention, the data processing apparatus incorporates a host side serial signal I/O block for communicating data to the external storage apparatus by using serial signals; a control signal output block for supplying, to the external storage apparatus, a control signal for controlling timing at which data which is communicated by the host side serial signal I/O block is switched, and a synchronizing signal output block for supplying, to the external storage apparatus, a synchronizing signal of data which is communicated by the host side serial signal I/O block. The host side serial signal I/O block performs at least transmitting data of a control command for controlling the operation of the external storage apparatus, receiving a status signal indicating a state of the operation of the external storage apparatus, transmitting data which is written on the external storage apparatus and receiving data which is read from the external storage apparatus by using serial signals.

On the other hand, the external storage apparatus incorporates an external serial signal I/O block for communicating data to the data processing apparatus by using serial signals; a control signal input block for receiving, from the data processing apparatus, a control signal for controlling timing at which data which is communicated by the external serial signal I/O block is switched; and a synchronizing signal input block for receiving, from the data processing apparatus, a synchronizing signal of data which is communicated by the external serial signal I/O block. The external serial signal I/O block performs at least receiving data of the control command, transmitting the status signal, receiving data which is written thereon and transmitting data which is read therefrom to and from the data processing apparatus by using serial signals.

The data transmitting method includes the steps of: making the signal level of the control signal which is transmitted from the control signal output block to be a predetermined level in accordance with data which is communicated between the host side serial signal I/O block and the external serial signal I/O block. When the state of the external serial signal I/O block has been changed from a state in which the external serial signal I/O block does not receive input of a signal from the data processing apparatus to a state in which the external serial signal I/O block waits for input of a signal, a ready signal having the signal level which is repeatedly changed at predetermined cycles is transmitted from the external storage apparatus. When the external storage apparatus is performing a process in accordance with data of a control command and the external storage apparatus is in a state in which the external storage apparatus does not receive input of a signal from the data processing apparatus, a busy signal having a predetermined signal level is, as a status signal, transmitted from the external serial signal I/O block or the output of a signal from the external serial signal I/O block is paused. If an error is made when the external serial signal I/O block receives data of a control command, output of a signal from the external serial signal I/O block is paused.

The data transmitting method has the structure that the signal level of the control signal which is supplied to the external storage apparatus in accordance with data which is communicated between the host side serial signal I/O block and the external serial signal I/O block is made to be predetermined level. When the external storage apparatus has been changed from a state in which it does not receive supply of a signal from the data processing apparatus to a state in which the external storage apparatus waits for the supply of a signal, a ready signal having a signal level which is changed at predetermined cycles is transmitted from the external storage apparatus. When the external storage apparatus is in a state in which it is performing a process in accordance with data of a control command and thus it does not receive supply of a signal from the data processing apparatus, a busy signal having a constant signal level is, as a status signal, transmitted from the external serial signal I/O block or transmission of a signal from the external serial signal I/O block is interrupted. If an error is made when data of a control command is received by the external serial signal I/O block, transmission of a signal from the external serial signal I/O block is interrupted.

Other objects, features and advantages of the invention will be evident from the following detailed description of the preferred embodiments described in conjunction with the attached drawings.

DESCRIPTION OF THE PREFERRED EMBODIMENTS

A data processing apparatus and a memory card which is an external storage apparatus for the data processing apparatus according to the present invention will now be described with reference to the drawings.

Figure 1:
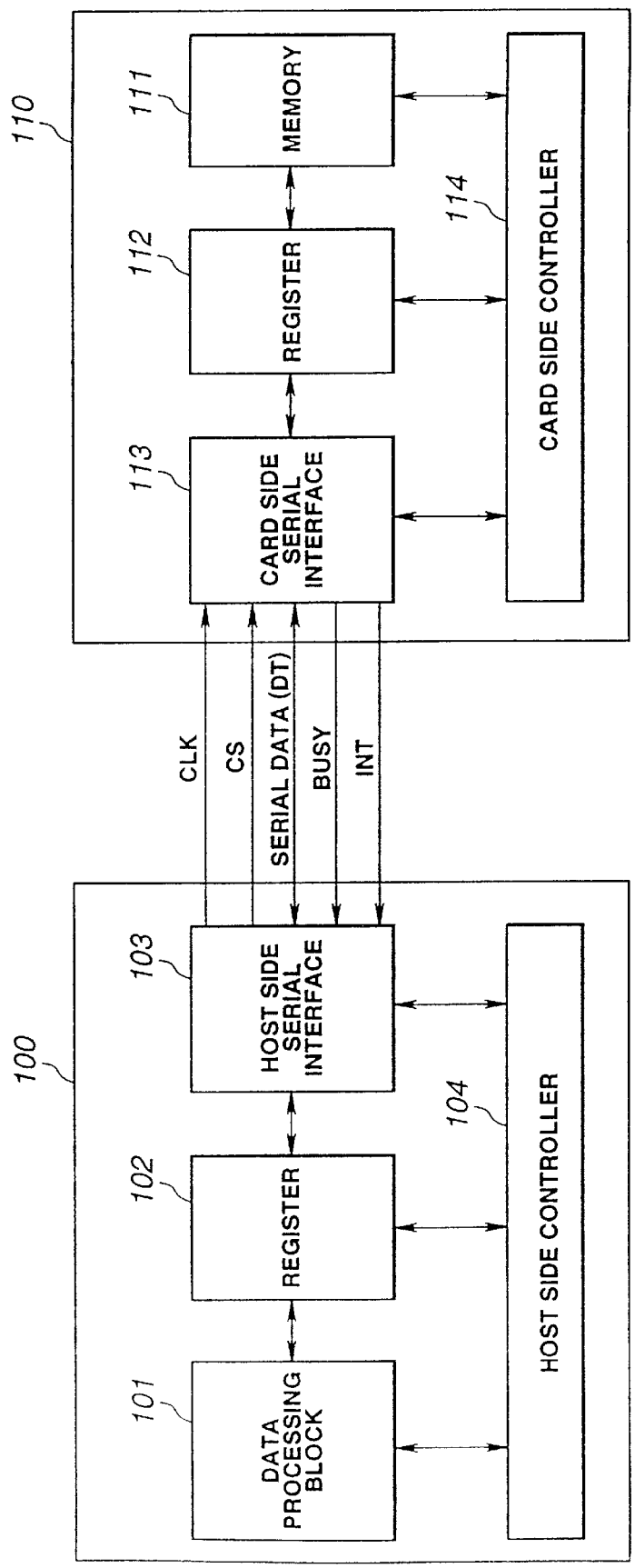
FIG. 1 is a block diagram showing a conventional data processing apparatus and a memory card.
Figure 2:
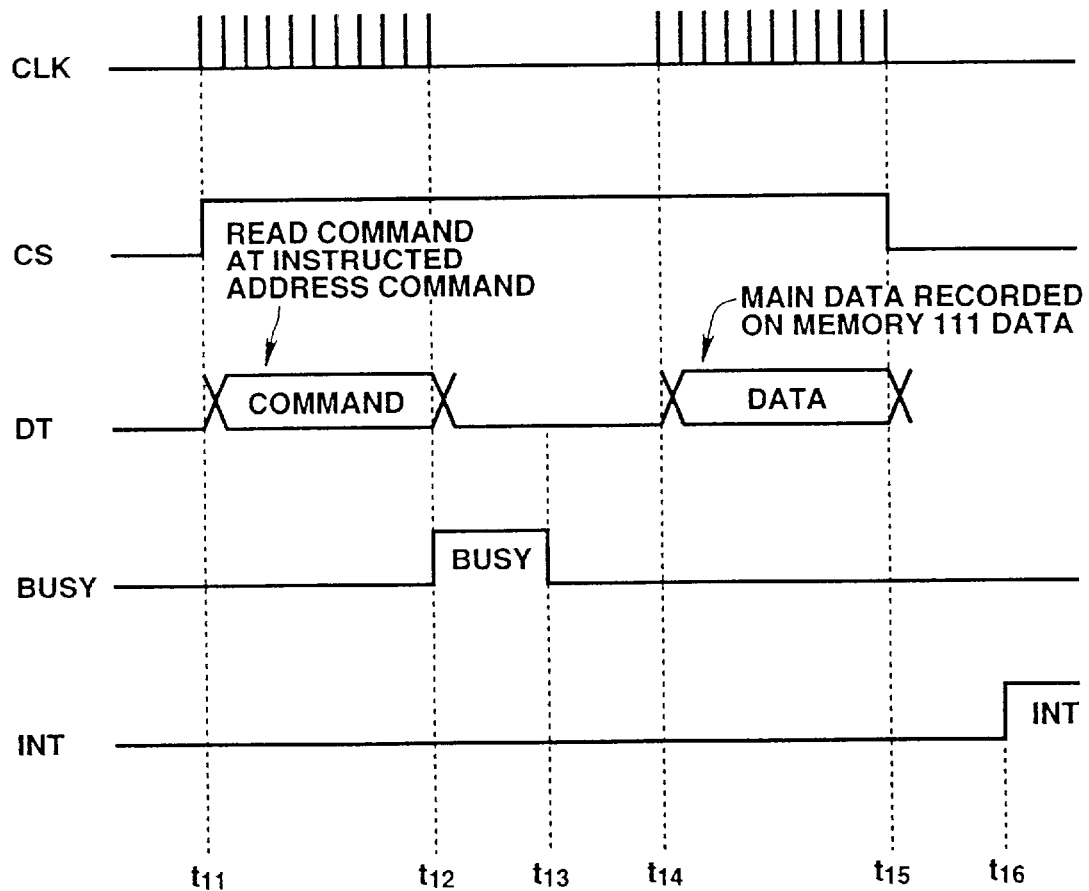
FIG. 2 is a time chart of data which is communicated between the conventional data processing apparatus and the memory card.
Figure 3:
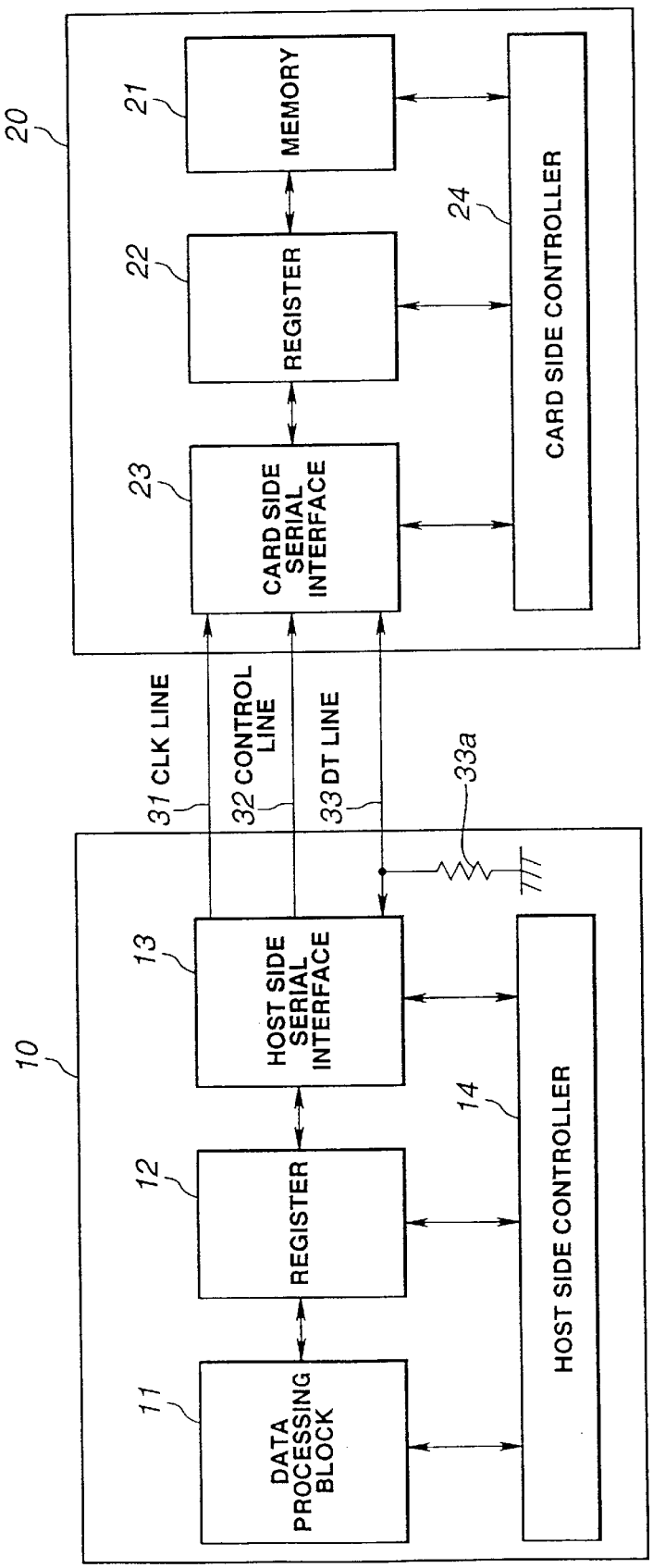
FIG. 3 is a block diagram showing a data processing apparatus and a memory card according to an embodiment of the present invention.

As shown in FIG. 3, a data processing apparatus 10 includes, a data processing block 11, a register 12, a host side serial interface circuit 13 and a host side controller 14. A memory card 20 is a storage medium having a card-like shape and arranged to be connected to the data processing apparatus 10 so that the memory card 20 serves as an external storage apparatus. The memory card 20 has a memory 21, a register 22, a card side serial interface circuit 23 and a card side controller 24.

The data processing block 11 of the data processing apparatus 10 variously processes data stored on the memory card 20. Moreover, the data processing block 11 performs the various data processes so as to generate data which must be written on the memory card 20. The data processing block 11 serves as a data processing circuit for a computer apparatus, an apparatus for recording/reproducing a digital audio signal, an audio visual apparatus, such as a camera unit or the like of a type which uses the memory card 20.

The register 12 is a buffer between the data processing block 11 and the host side serial interface circuit 13. That is, the data processing apparatus 10 temporarily stores data on the register 12, and then supplies data to the host side serial interface circuit 13 when the data processing apparatus 10 supplies data from the data processing block 11 to the host side serial interface circuit 13. Similarly, the data processing apparatus 10 temporarily stores data in the register 12, and then supplies data to the data processing block 11 when the data processing apparatus 10 supplies data from the host side serial interface circuit 13 to the data processing block 11.

The host side serial interface circuit 13 converts data supplied from the data processing block 11 to the register 12 and a command supplied from the card side controller 24 into serial signals so as to supply the serial signals to the memory card 20. The host side serial interface circuit 13 converts data and the command supplied from the memory card 20 into parallel signals so as to supply data and the command to the data processing block 11 and the card side controller 24.

The host side serial interface circuit 13 supplies synchronizing signals (CLK) of various data and the command to the memory card 20. The host side serial interface circuit 13 acquires a status signal (STATUS) which is supplied from the memory card 20 and which indicates a state of the operation of the memory card 20.

The host side controller 14 controls the data processing operation which is performed by the data processing block 11 and the data transmitting operations which are performed by the host side serial interface circuit 13. The host side controller 14 supplies a command, which is a control command for the memory card 20, to the memory card 20 through the register 22.

On the other hand, the memory 21 of the memory card 20 includes, for example, a flush memory, on which data supplied from the data processing block 11 is stored.

The register 22 is a buffer between the memory 21 and the card side serial interface circuit 23. That is, when data supplied from the data processing apparatus 10 is written on the memory 21, data is temporarily stored on the register 12, and then data which must be written is supplied to the memory 21. Similarly, when the data processing apparatus 10 reads data from the memory 21, data is temporarily stored in the register 12, and then read data is supplied to the card side serial interface circuit 23. That is, the register 22 is a circuit having a function to serve as a so-called page buffer for the flush memory.

The card side serial interface circuit 23 is controlled by the card side controller 24 in such a manner as to convert data of the parallel signal supplied from the memory 21 and the command supplied from the card side controller 24 into serial signals so as to supply the serial signals to the data processing apparatus 10. The card side serial interface circuit 23 converts data and the command formed into the serial signals supplied from the data processing apparatus 10 into parallel signals so as to supply the parallel signals to the memory 21 and the card side controller 24.

The card side serial interface circuit 23 acquires a synchronizing signal (CLK) or the like of various data and the command from the data processing apparatus 10. The card side serial interface circuit 23 supplies the status signal to the data processing apparatus 10.

The card side controller 24 controls the operation for storing, reading and erasing data in the memory 21 in accordance with a command or the like supplied from the data processing apparatus 10. The card side controller 24 controls the data transmitting operation which is performed by the card side serial interface circuit 23. The host side controller 14 performs control in such a manner as to supply the status signal of the memory card 20 to the memory card 20. The above-mentioned data transmission between the data processing apparatus 10 and the memory card 20 is performed through a transmission line arranged between the host side serial interface circuit 13 and the card side serial interface circuit 23.

Three signal lines consisting of a CLK line 31, a control line 32 and a DT line 33 are arranged between the card side serial interface circuit 23 of the data processing apparatus 10 and the card side serial interface circuit 23 of the memory card 20.

Main data, that is, data which must be written on the memory 21 by the data processing block 11 and data which must be read from the memory 21 so as to be supplied to the data processing block 11 are transmitted to the DT line 33. A command which is a control command arranged to be supplied from the data processing apparatus 10 to the memory card 20 and a command which is supplied from the memory card 20 to the data processing apparatus 10 are transmitted to the DT line 33. That is, main data and the command formed into serial signals are bidirectionally transmitted to the DT line 33.

A resistor 33a having a grounded end is joined to the DT line 33. The resistor 33a is a so-called pull-down resistor. Thus, when the signal communication between the host side serial interface circuit 13 and the card side serial interface circuit 23 through the DT line 33 is not performed, the signal level of the DT line 33 is made to be a low level. That is, when the signal communication through the DT line 33 is not performed, the signal level of the DT line 33 is made to be a predetermined level which is determined by the resistance value or the like of the resistor 33a.

In this embodiment, the resistor 33a is the so-called pull-down resistor so as to make the signal level of the DT line 33 to be the low level when signal communication through the DT line 33 is not performed. The resistor 33a may be a so-called a pull-up resistor so as to make the signal level of the DT line 33 to be a high level when signal communication through the DT line 33 is not performed.

The synchronizing signal of main data and the command which must be transmitted to the DT line 33 is transmitted from the data processing apparatus 10 to the memory card 20 through the CLK line 31.

The control signal is transmitted from the data processing apparatus 10 to the memory card 20 through the control line 32. In a period of time in which the control signal is supplied, that is, in a period of time in which the signal level is, for example, high, main data and the command are transmitted.

In addition to main data and the command, the status signal (STATUS) indicating the state of the operation of the memory card 20 is supplied from the memory card 20 to the data processing apparatus 10 through the DT line 33. The supply of the status signal is performed in a period of time in which main data and the command are not transmitted to the DT line 33, that is, in a period of time in which the control signal is not supplied, for example, in a period of time in which the signal level is low. The status signal includes a busy signal (BUSY) indicating that the memory card 20 is performing a process. When the memory card 20 is performing, for example, a writing process and thus an access from the data processing apparatus 10 is inhibited, the busy signal is supplied from the memory card 20 to the data processing apparatus 10. The status signal includes an interrupt signal (INTERRUPT) indicating an interruption from the memory card 20 to the data processing apparatus 10. For example, when an interruption command is requested from the memory card 20 to the data processing apparatus 10, the interrupt signal is supplied. Note that the busy signal and the interrupt signal are examples and any signal that indicates the state of the operation of the memory card 20 may be employed as the status signal.

Figure 4:
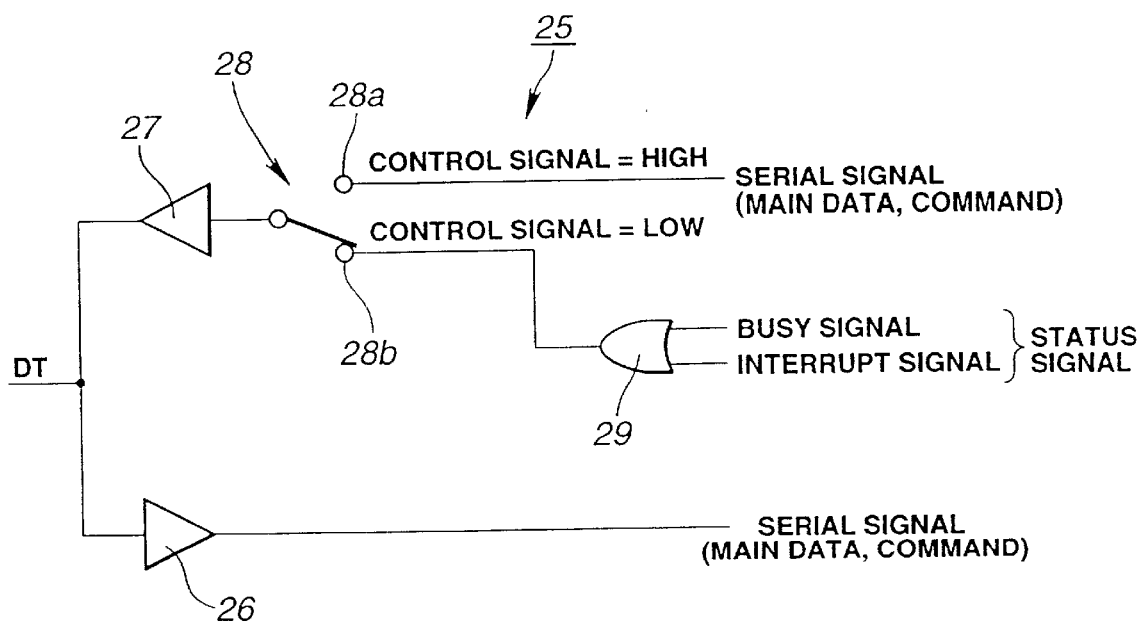
FIG. 4 is a circuit diagram showing an output circuit in the memory card.

As described above, the status signal is supplied during a period in which the control signal is not supplied by providing an output circuit arranged as shown in FIG. 4 for the memory card 20.

An output circuit 25 of the memory card 20 is disposed between the card side serial interface circuit 23 and an I/O terminal of the DT line 33. The output circuit 25 includes an input buffer 26, an output buffer 27, a selection switch 28 and an OR circuit 29.

The input buffer 26 is connected to the DT line 33 so as to be supplied with the serial signal supplied from the data processing apparatus 10. Then, the input buffer 26 supplies the serial to the card side serial interface circuit 23.

The output buffer 27 produces outputs of the serial signal, the busy signal and the interrupt signal supplied through the selection switch 28 to the DT line 33.

The OR of the busy signal and interrupt signal supplied from the card side controller 24 is calculated by the OR circuit 29 so as to be supplied to a terminal 28b of the selection switch 28. The serial signal supplied from the card side serial interface circuit 23 is supplied to a terminal 28a of the selection switch 28.

The selection switch 28 is switched to the terminal 28a when the signal level of the control signal is high. When the selection switch 28 has been switched to the terminal 28a, the serial signal obtained from the card side serial interface circuit 23 is supplied to the output buffer 27. When the signal level of the control signal is low, the selection switch 28 is switched to the terminal 28b. When the selection switch 28 has been switched to the terminal 28b, the status signals, such as the busy signal and interrupt signal, transmitted from the card side controller 24 are supplied to the output buffer 27.

Figure 5:
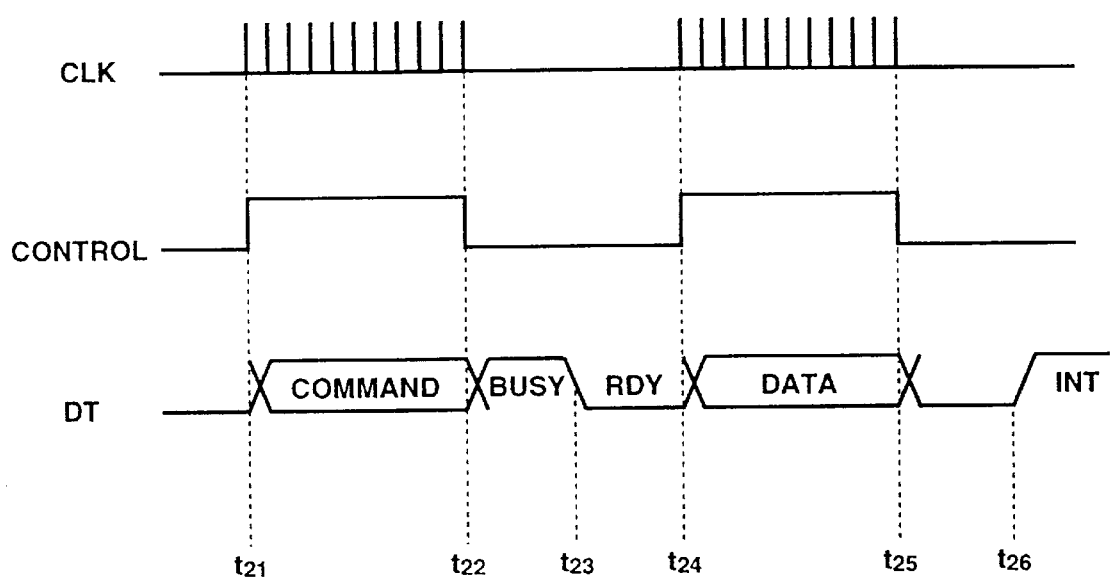
FIG. 5 is a time chart of data which is communicated between the data processing apparatus and the memory card.

The variety of the signals are transmitted to the above-mentioned transmission lines in accordance with a time chart arranged as shown in FIG. 5. With reference to the time chart shown in FIG. 5, a process for reading main data stored in the memory card 20 will now be described.

At time $t_{21}$, the data processing apparatus 10 supplies the control signal to the memory card 20 through the control line 32. After the memory card 20 has acquired the control signal, the memory card 20 performs a preparation for acquiring a command which will be supplied from the data processing apparatus 10. The data processing apparatus 10 supplies the control signal. Moreover, the data processing apparatus 10 supplies a reading command and the like to the memory card 20 through the DT line 33. In addition to the foregoing command and the like, the data processing apparatus 10 supplies a synchronizing signal to the memory card 20 through the CLK line 31.

After the data processing apparatus 10 has supplied the reading command and the like, the data processing apparatus 10 stops the supply of the command, the control signal and the synchronizing signal at time $t_{22}$. The synchronizing signal is not required to be paused at $t_{22}$.

After the memory card 20 has acquired the command, the memory card 20 supplies the busy signal to the data processing apparatus 10 through the DT line 33 in order to perform control in accordance with the supplied command. Since the data processing apparatus 10 is not supplying the control signal at this point in time, the data processing apparatus 10 is able to make a determination that the signal supplied from the memory card 20 is the busy signal. After the memory card 20 has supplied the busy signal, the memory card 20 reads main data at the instructed address from the memory 21 and supplies main data to the register 22.

After the memory card 20 has read main data and supplied the same to the register 22, the memory card 20 pauses the supply of the busy signal through the DT line 33 at time $t_{23}$. That is, the memory card 20 communicates, to the data processing apparatus 10, a ready state in which a preparation for supplying main data has been completed.

After the data processing apparatus 10 has detected the pause of the supply of the busy signal at time $t_{24}$, the data processing apparatus 10 makes a determination that the control which must be performed in accordance with the command supplied from the memory card 20 has been completed. Thus, the data processing apparatus 10 supplies the control signal and the synchronizing signal. Since the control signal has been supplied, the memory card 20 synchronizes main data with the synchronizing signal supplied through the DT line 33 so as to transmit the synchronized main data to the data processing apparatus 10.

After the memory card 20 has completed the transmission of main data, the data processing apparatus 10 interrupts supply of the synchronizing signal and the control signal at time $t_{25}$.

If the internal state of the memory card 20 is changed because of a result of the reading process or the like, the memory card 20 supplies an interrupt signal indicating interruption to the data processing apparatus 10 through the DT line 33 at time $t_{26}$, if necessary. The data processing apparatus 10 is able to make a determination that the signal supplied from the memory card 20 is the interrupt signal because the data processing apparatus 10 is not supplying the control signal. If the interrupt signal is supplied, the data processing apparatus 10 acquires the cause of this interruption by supplying a control signal and a corresponding command.

As described above, the data processing apparatus 10 and the memory card 20 are structured in such a manner that the status signal is transmitted from the memory card 20 through the DT line 33 Therefore, the number of signal lines can be reduced. Thus, signal lines for the busy signal and the interrupt signal are not required. As a result, data can reliably be transmitted by a simple structure. Although the conventional structure is required to perform a polling operation for a predetermined period of time if data communication is performed between a data processing apparatus and a memory card without using the interrupt signal, the polling operation is not required for the data processing apparatus 10 according to the present invention.

The contents of the commands which are supplied from the data processing apparatus 10 to the memory card 20 and those of the command which are supplied from the memory card 20 to the data processing apparatus 10 are previously determined by the card side controller 24. For example, the writing command, the reading command and the erasing command are previously determined. When any one of the above-mentioned commands is transmitted through the DT line 33, the sequential order of data, command or the status signal which is then transmitted to the DT line 33 is determined without exception.

When the writing command has been transmitted from the data processing apparatus 10 to the memory card 20, main data attempted to be written on the memory card 20 is transmitted from the data processing apparatus 10 to the memory card 20 after the writing command has been transmitted. The memory card 20, to which the writing command and main data have been transmitted, transmits the busy signal to the data processing apparatus 10 during a period in which main data is being written. After main data has been written, the memory card 20 transmits the ready signal to the data processing apparatus 10. When the reading command has been transmitted from the data processing apparatus 10 to the memory card 20, the memory card 20 performs an operation for reading main data which corresponds to the reading command. In a period of time in which the reading operation is performed, the memory card 20 transmits the busy signal to the data processing apparatus 10. After the reading operation has been completed, the memory card 20 transmits the ready signal to the data processing apparatus 10. After the data processing apparatus 10 has received the ready signal, main data is transmitted from the memory card 20 to the data processing apparatus 10. Thus, the operation for reading main data is performed.

A second data transmitting method will now be described which is employed when the contents and sequential order of data which is transmitted through the DT line 33 have been determined with the commands.

The second data transmitting method is arranged in such a manner that the state of data which is transmitted through the DT line 33 is determined by switching the control signal. That is, the state of data which must be transmitted is determined by switching the control signal, and then data transmission is performed.

The state of data which is transmitted through the DT line 33 is determined as follows: a state in which no control command, that is, no command is issued from the data processing apparatus 10 to the memory card 20 and no process is being performed by the memory card 20 is made to be an initial state which is "STATUS 0". A state in which a command is being supplied from the data processing apparatus 10 to the memory card 20, for example, a state in which a writing command, a reading command or a erasing command is being supplied through the DT line 33 is made to be "STATUS 1". Then, the state proceeds to "STATUS 2" and "STATUS 3" in each of which the process corresponding to the command supplied in "STATUS 1" is performed. Then, the state is returned to "STATUS 0" after "STATUS 3" has been performed.

The control signal is a signal for switching the states from "STATUS 0" to "STATUS 3". That is, the signal level of the control signal is a low level in "STATUS 0". When the signal level of the control signal in "STATUS 0" has been made to be a high level, the state is switched to "STATUS 1". When the signal level of the control signal in "STATUS 1" has been made to be low, the state is switched to "STATUS 2". When the signal level of the control signal in "STATUS 2" has been made to be high, the state is switched to "STATUS 3". When the signal level of the control signal in "STATUS 3" has been switched to be low, the state is switched to "STATUS 0".

The control signal is switched as described above so that the contents of data which is transmitted through the DT line 33 are switched. In accordance with the contents of the command transmitted in "STATUS 1", the data processing apparatus 10 and the memory card 20 determine the contents of data which is transmitted in "STATUS 2" and "STATUS 3" and perform the processes corresponding to the status.

If main data is read from the memory card 20, "STATUS 1" is initially realized so that a reading command is transmitted from the data processing apparatus 10 to the memory card 20. Then, "STATUS 2" is realized in which the memory card 20 performs an operation for reading main data to follow the reading command. During the foregoing process, the busy signal is transmitted from the memory card 20 to the data processing apparatus 10. After the foregoing process has been completed, the ready signal is transmitted from the memory card 20 to the data processing apparatus 10. When the ready signal has been detected by the data processing apparatus 10, "STATUS 3" is realized so that transmission of main data read from the memory card 20 to the data processing apparatus 10 is performed through the DT line 33. After the transmission of main data has been completed, the state is returned to "STATUS 0".

If main data is written on the memory card 20, "STATUS 1" is initially realized so that a writing command is transmitted from the data processing apparatus 10 to the memory card 20. Then, "STATUS 2" is realized so that main data which is written on the memory card 20 is transmitted from the data processing apparatus 10 to the memory card 20 through the DT line 33. Then, "STATUS 3" is realized so that the process for writing main data is performed by the memory card 20 to follow the writing command. During the above-mentioned process, the busy signal is transmitted from the memory card 20 to the data processing apparatus 10. After the above-mentioned process has been completed, the ready signal is transmitted from the memory card 20 to the data processing apparatus 10. When the ready signal has been detected by the data processing apparatus 10, the state is returned to "STATUS 0".

If main data written on the memory card 20 is erased, an erasing command is, in "STATUS 1", initially transmitted from the data processing apparatus 10 to the memory card 20. Then, "STATUS 2" is realized so that a process for erasing main data is performed by the memory card 20 to follow the erasing command. During the foregoing process, the busy signal is transmitted from the memory card 20 to the data processing apparatus 10. After the above-mentioned process has been completed, the ready signal is transmitted from the memory card 20 to the data processing apparatus 10. When the data processing apparatus 10 has detected the ready signal, the state is returned to "STATUS 0".

Figure 6:
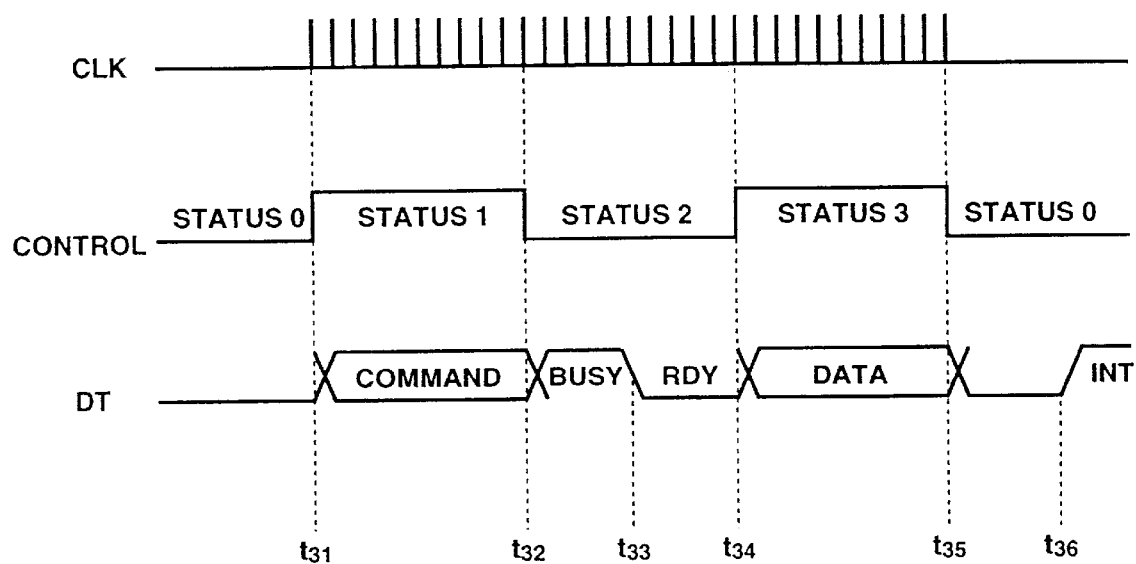
FIG. 6 is a time chart of data which is communicated between the data processing apparatus and the memory card.
Figure 7:
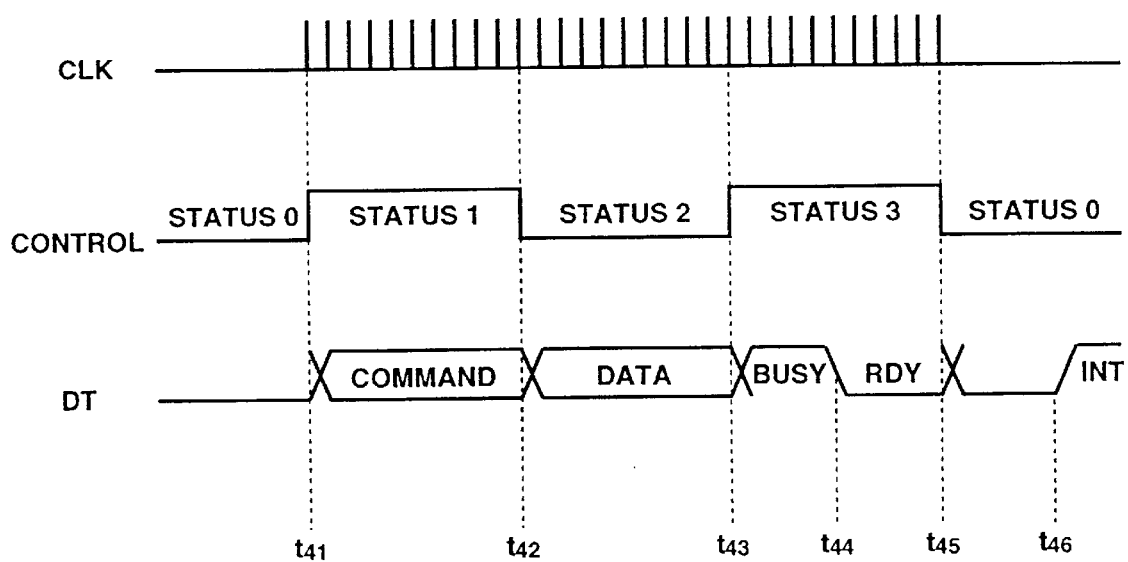
FIG. 7 is a time chart of data which is communicated between the data processing apparatus and the memory card.

The second data-transmitting method for controlling a state of data transmission by switching the control signal in accordance with data which is transmitted to the DT line 33 will now be described with reference to time charts shown in FIGS. 6 and 7. The time chart shown in FIG. 6 is an example of a time chart with which main data written on the memory card 20 is read by the data processing apparatus 10. The time chart shown in FIG. 7 is an example of a time chart with which main data is written on the memory card 20 by the data processing apparatus 10.

Referring to FIG. 6, an operation for reading main data will now be described.

In a state in which data communication is not performed between the data processing apparatus 10 and the memory card 20, the signal level of the control signal is made to be a low level. Thus, the initial state in which the state is "STATUS 0" is realized. The process for reading main data is started in the initial state in which the state is "STATUS 0".

At time $t_{31}$ at which the process for reading main data is started, the data processing apparatus 10 switches the signal level of the control signal which is supplied to the memory card 20 through the control line 32 from the low level to the high level. Therefore, the state of data which is transmitted to the DT line 33 is switched from "STATUS 0" to "STATUS 1". When the memory card 20 acquires the foregoing control signal, the memory card 20 makes a determination that the state has been switched from "STATUS 0" to "STATUS 1". Thus, the memory card 20 performs a preparation for acquiring the command which will be supplied from the data processing apparatus 10. In a period of time in which the state is "STATUS 1", the data processing apparatus 10 supplies the reading command to the memory card 20 through the DT line 33. Moreover, the data processing apparatus 10 supplies the synchronizing signal of the reading command to the memory card 20 through the CLK line 31. When the memory card 20, in the state of "STATUS 1", acquires the reading command, the memory card 20 determines the contents of data which is transmitted through the DT line 33 in the following states "STATUS 2" and "STATUS 3".

At time $t_{32}$ at which the supply of the reading command has been completed, the data processing apparatus 10 switches the signal level of the control signal from the high level to the low level. That is, the data processing apparatus 10 switches the state from "STATUS 1" to "STATUS 2".

When "STATUS 2" has been realized, the memory card 20 performs a process in accordance with the reading command supplied when the state is "STATUS 1". Specifically, the memory card 20 performs a process for reading main data of the address instructed with the reading command from the memory 21 to supply main data to the register 22. During the above-mentioned process, the memory card 20 supplies the busy signal to the data processing apparatus 10 through the DT line 33, the busy signal being supplied as the status signal. That is, when the state is "STATUS 2", the memory card 20 initially transmits the busy signal as the status signal. Since the command supplied to the memory card 20 is the reading command and the present state is "STATUS 2", the data processing apparatus 10 makes a determination that the signal which is being transmitted from the memory card 20 is the status signal.

After the operation for reading and supplying main data to the register 22 has been completed, the memory card 20 pauses the output of the busy signal serving as the status signal through the DT line 33 at time $t_{33}$ at which the operation for reading and supplying main data to the register 22 has been completed. Then, the memory card 20 starts producing an output of the ready signal indicating that the preparation for supplying main data to the data processing apparatus 10 has been completed. That is, when the operation for reading and supplying main data to the register 22 has been completed in "STATUS 2", the memory card 20 transmits the ready signal serving as the status signal.

When the signal level of a signal which is transmitted from the memory card 20 through the DT line 33 is high when the state is "STATUS 2", the busy signal is transmitted. When the signal level is low when the state is "STATUS 2", the ready signal is transmitted. Since the command supplied to the memory card 20 is the reading command when the state is "STATUS 2" and the present state is "STATUS 2", the data processing apparatus 10 is able to determine that the signal which is being transmitted from the memory card 20 is the status signal. Therefore, when level of the signal which is transmitted from the memory card 20 through the DT line 33 is simply switched from the high level to the low level, the data processing apparatus 10 is able to detect a fact that the signal has been switched from the busy signal to the ready signal.

After the data processing apparatus 10 has received the ready signal from the memory card 20, the data processing apparatus 10 makes a determination that the process of the memory card 20 which is performed in accordance with the reading command has been completed. At time $t_{34}$ at which the determination has been made that the process of the memory card 20 which is performed in accordance with the reading command has been completed, the signal level of the control signal is switched from the low level to the high level. That is, the state is switched from "STATUS 2" to "STATUS 3".

When "STATUS 3" has been realized, the memory card 20 transmits main data read and supplied to the register 22 when the state is "STATUS 2" to the data processing apparatus 10 through the DT line 33. At time $t_{35}$ at which the transmission of main data from the memory card 20 to the data processing apparatus 10 has been completed, the data processing apparatus 10 pauses the supply of the synchronizing signal. Moreover, the data processing apparatus 10 switches the signal level of the control signal from the high level to the low level. That is, the state is returned from "STATUS 3" for transmitting main data to "STATUS 0" which is the initial state.

If the internal state of the memory card 20 is changed because of the influence of the reading process or the like and therefore an interruption process must be performed, the memory card 20 supplies the interrupt signal indicating the interruption to the data processing apparatus 10 through the DT line 33 at time $t_{36}$ when the state is "STATUS 0". The data processing apparatus 10 is previously arranged in such a manner as to determine that when a signal is supplied from the memory card 20 through the DT line 33 in a state where the state is "STATUS 0", the data processing apparatus 10 is previously arranged in such a manner that the supplied signal is the interrupt signal. As a result, a determination is made by the data processing apparatus 10 that the supplied signal is the interrupt signal. The data processing apparatus 10, which has received the interrupt signal, performs a required process in response to the interrupt signal.

Referring to FIG. 7, an operation for writing main data will now be described.

In a state in which data transmission is not performed between the data processing apparatus 10 and the memory card 20, the signal level of the control signal is made to be the low level. Thus, the state is "STATUS 0" which is the initial state. The process for writing main data is started in "STATUS 0" which is the initial state.

At time $t_{41}$ at which the process for writing main data is started, the data processing apparatus 10 switches the signal level of the control signal which is supplied to the memory card 20 through the control line 32 from the low level to the high level. Therefore, the state of data which is transmitted to the DT line 33 is switched from "STATUS 0" to "STATUS 1". When the memory card 20 has acquired the foregoing control signal, the memory card 20 makes a determination that the state has been switched from "STATUS 0" to "STATUS 1". Thus, the memory card 20 performs a preparation for acquiring a command which will be supplied from the data processing apparatus 10. When the state is "STATUS 1", the data processing apparatus 10 supplies the writing command to the memory card 20 through the DT line 33. Moreover, the data processing apparatus 10 supplies its synchronizing signal to the memory card 20 through the CLK line 31. Since the memory card 20 acquires the writing command when the state is "STATUS 1", the memory card 20 determines the contents of data which will be transmitted through the DT line 33 in the following "STATUS 2" and "STATUS 3".

At time $t_{42}$ at which the supply of the writing command has been completed, the data processing apparatus 10 switches the control signal from the high level to the low level. That is, the data processing apparatus 10 switches the state from "STATUS 1" to "STATUS 2".

When the state is "STATUS 2", the data processing apparatus 10 transmits main data attempted to be written on the memory card 20 to the memory card 20 through the DT line 33. At time $t_{43}$ at which the transmission of main data to the memory card 20 has been completed, the data processing apparatus 10 switches the signal level of the control signal from the low level to the high level. That is, the data processing apparatus 10 switches the state from "STATUS 2" to "STATUS 3".

When "STATUS 3" has been realized, the memory card 20 performs a process, which is performed in accordance with the writing command supplied when the state is "STATUS 1", that is, the process for writing, on the memory 21, main data transmitted from the data processing apparatus 10 when the state is "STATUS 2". During the foregoing process, the memory card 20 supplies the busy signal, which is a status signal, to the data processing apparatus 10 through the DT line 33. That is, when the state is "STATUS 3", the memory card 20 initially transmits the busy signal as the status signal. At this time, the data processing apparatus 10 makes a determination that the signal which is being transmitted from the memory card 20 is the status signal because the command supplied to the memory card 20 is the writing command and the present state is "STATUS 3".

After the operation for writing main data on the register 22 has been completed, the memory card 20 pauses the output of the busy signal which is the status signal at time $t_{44}$ at which the operation for writing main data on the register 22 has been completed. Moreover, the memory card 20 starts producing the output of the ready signal indicating a fact that writing of main data has been completed. That is, when the state is "STATUS 3", the memory card 20 transmits the ready signal which is the status signal after main data has been written on the register 22.

In this embodiment, the busy signal is transmitted when the signal level of the signal which is transmitted from the memory card 20 through the DT line 33 is the high level in a case where the state is "STATUS 3". When the signal level is low, the ready signal is transmitted. When the state is "STATUS 3", the data processing apparatus 10 is able to make a determination that the signal which is being transmitted from the memory card 20 is the status signal because the command supplied to the memory card 20 is the writing command and the present state is "STATUS 3". Therefore, when the signal level of the signal which is transmitted from the memory card 20 through the DT line 33 is simply switched from the high level to the low level, the data processing apparatus 10 is able to detect a fact that the foregoing signal has been switched from the busy signal to the ready signal.

When the data processing apparatus 10 has received the ready signal from the memory card 20, the data processing apparatus 10 makes a determination that the process which is performed by the memory card 20 in accordance with the writing command has been completed. At time $t_{45}$ at which the determination has been made that the process which is performed by the memory card 20 in accordance with the writing command has been completed, the data processing apparatus 10 pauses the supply of the synchronizing signal. Moreover, the data processing apparatus 10 switches the signal level of the control signal from the high level to the low level. That is, the state is returned from "STATUS 3" in which main data is written to "STATUS 0" which is the initial state If the internal state of the memory card 20 is changed as a result of an influence of the writing process and the like and thus an interruption process must be performed, the memory card 20, at time $t_{46}$, supplies the interrupt signal indicating the interruption to the data processing apparatus 10 through the DT line 33 when the state is "STATUS 0". The data processing apparatus 10 is previously arranged in such a manner that when a signal is supplied from the memory card 20 through the DT line 33 when the state is "STATUS 0", the data processing apparatus 10 determines that the supplied signal is the interrupt signal. As a result, the determination is made by the data processing apparatus 10 that the supplied signal is the interrupt signal. The data processing apparatus 10 which has received the interrupt signal performs the required process in response to the interrupt signal.

As described above, the data processing apparatus 10 and the memory card 20 according to the present invention have the structure that the contents of data which is transmitted to the DT line 33 are determined by switching the control signal. Thus, the DT line 33 is able to transmit the status signal and the interrupt signal as well as the commands and main data. Therefore, the number of signal lines required between the data processing apparatus 10 and the memory card 20 can be reduced. For example, signal lines for transmitting only the busy signal and the interrupt signal are not required. Therefore, reliable data transmission can be performed by a simple structure. Moreover, an overhead in switching data which must be transmitted through the DT line 33 can be prevented. As a result, the efficiency for transmitting data can be raised.

Although the data processing apparatus 10 and the memory card 20 have been described as the embodiments of the present invention, the present invention may be applied to another data processing apparatus in place of the memory card 20. In this case, the commands and the like which must be transmitted must previously be set into another data processing apparatus. Also in this case, any commands can be transmitted as well as the commands which are issued to the memory card 20.

The second method for communicating data between the data processing apparatus 10 and the memory card 20 has the structure that the contents of data which must be transmitted to the DT line 33 and which is switched in accordance with the control signal are classified into four patterns consisting of "STATUS 0", "STATUS 1", "STATUS 2" and "STATUS 3". The patterns are not limited to the above-mentioned four patterns. A larger number of patterns may be provided so as to be switched to correspond to the contents of the commands which must be transmitted.

Figure 8:
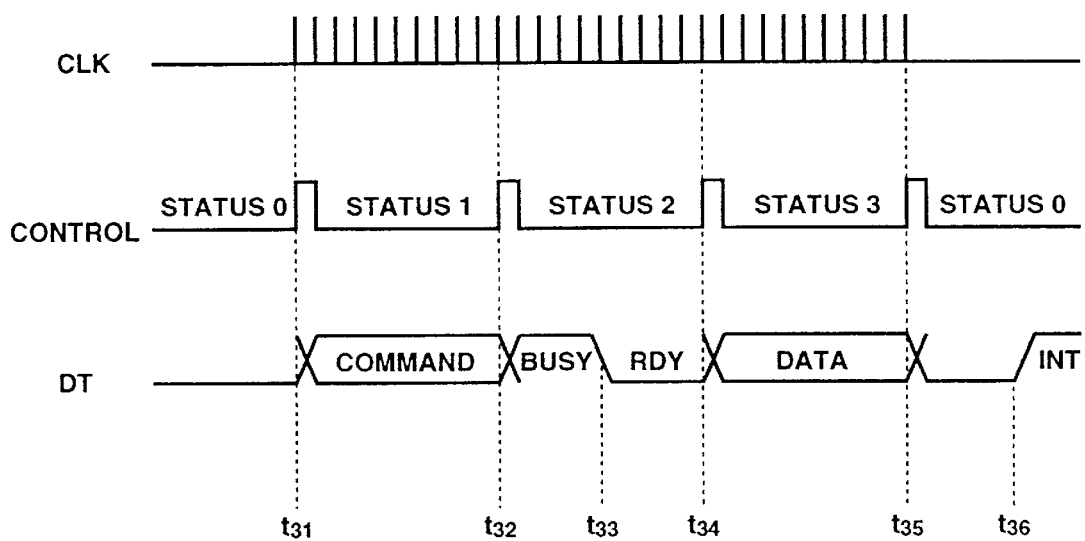
FIG. 8 is a time chart of data which is communicated between the data processing apparatus and the memory card.
Figure 9:
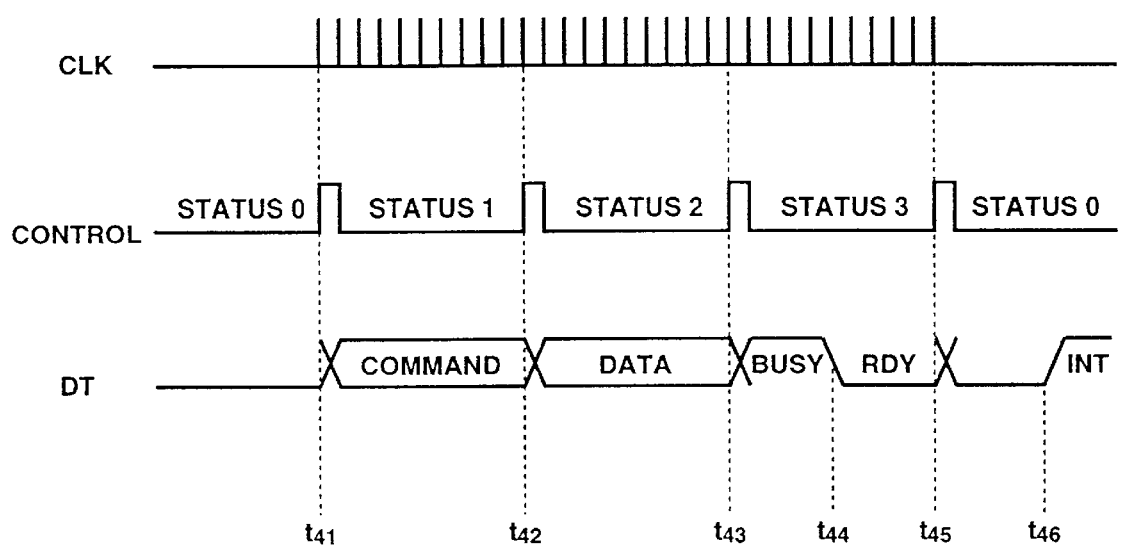
FIG. 9 is a time chart of data which is communicated between the data processing apparatus and the memory card.

The second method of transmitting data between the data processing apparatus 10 and the memory card 20 has the structure that the state of data to be transmitted to the DT line 33 is switched by switching on/off the control signal. However, the foregoing state may be switched in response to a pulse signal as shown in FIGS. 8 and 9. FIGS. 8 and 9 are time charts which are employed when the pulse signal is employed as the control signal. Similarly to FIG. 6, FIG. 8 is a time chart for use when main data written on the memory card 20 is read by the data processing apparatus 10. Similarly to FIG. 7, FIG. 9 is a time chart for use when main data is written on the memory card 20 by the data processing apparatus 10.

The memory card 20 may be provided with one power supply line, three ground lines and three reserve lines in addition to the CLK line 31, the control line 32 and the DT line 33 so that the memory card 20 is formed into a small-size memory card having ten signal lines. When three reserve lines are provided, the three reserve lines may be employed as DT lines in addition to one DT line so that four DT lines are provided which are arranged to be used in parallel with each other. When the three reserve lines are provided, the three reserve lines may be employed as a CLK line, a control line and a DT line, respectively. Thus, the three reserve line are combined with the CLK line 31, the control line 32 and the DT line 33 so that a pair of CLK lines, that of control lines and that of DT lines are formed.

The commands and main data which are transmitted through the DT line 33 by the second data transmitting method are enabled to be free from an influence of external noise or the like by transmitting an error correction code or the like together with the commands and main data. However, the transition among "STATUS 0", "STATUS 1", "STATUS 2" and "STATUS 3" of the control signal arranged to be transmitted through the CLK line 31 is indicated by only switching the signal level from the high level to the low level or the low level to the high level. Therefore, there is apprehension that an influence of external noise or the like is exerted on the control signal.

The examples shown in FIGS. 6 and 7 have the structure that the signal level of the control signal is made to be the low level when the state is "STATUS 0" or "STATUS 2". When the state is "STATUS 1" or "STATUS 3", the signal level of the control signal is made to be the high level. Moreover, determination whether the state is "STATUS 0" or "STATUS 2" and that whether the state is "STATUS 1" or "STATUS 3" are made by detecting the transition of the above-mentioned states. Therefore, if the transition of the above-mentioned states cannot correctly be detected, there is apprehension that the memory card 20 makes an incorrect determination between "STATUS 0" and "STATUS 2" and between "STATUS 1" and "STATUS 3".

If an influence of noise is exerted on the control signal during an operation for reading main data as shown in FIG. 6, there is apprehension that the memory card 20 makes an incorrect determination between "STATUS 1" and "STATUS 3". In this case, there is a possibility that a command which is transmitted from the data processing apparatus 10 to the memory card 20 and main data read from the memory card 20 conflict with each other.

If an influence of noise is exerted on the control signal during an operation for reading main data as shown in FIG. 6, there is apprehension that the memory card 20 makes an incorrect determination between "STATUS 0" and "STATUS 2". In this case, there is a possibility that a busy signal and a ready signal which must be transmitted when the state is "STATUS 2" are undesirably transmitted when the state is "STATUS 0". There is another possibility that the interrupt signal which must be transmitted when the state is "STATUS 0" is undesirably transmitted when the state is "STATUS 2".

If an influence of noise is exerted on the control signal during an operation for writing main data as shown in FIG. 7, there is apprehension that the memory card 20 makes an incorrect determination between "STATUS 1" and "STATUS 3". There is a possibility in this case that a command which is transmitted from the data processing apparatus 10 to the memory card 20 and a status signal which is transmitted from the memory card 20 conflict with each other. There is another possibility that the data processing apparatus 10 waits for the ready signal which will be supplied from the memory card 20 and the memory card 20 waits for the command which is issued from the data processing apparatus 10. In this case, there is possibility that data communication through the DT line 33 cannot be performed.

If an influence of noise is exerted on the control signal during an operation for writing main data as shown in FIG.

7, there is apprehension that the memory card 20 makes an incorrect determination between "STATUS 0" and "STATUS 2". In this case, there is a possibility that main data which is transmitted from the data processing apparatus 10 to the memory card 20 and the interrupt signal transmitted from the memory card 20 conflict with each other on the DT line 33.

To prevent the above-mentioned problems, an arrangement may be employed in which, for example, the ready signal is a signal, the level of which is repeatedly changed at predetermined cycles. Moreover, a state in which no output of a signal is produced from the memory card 20 is detected as a busy signal. An arrangement in which the ready signal and the busy signal are detected as described above will now be described.

A process for reading main data written on the memory card 20 will now be described with reference to a flow chart shown in FIG. 10 and flow charts shown in FIGS. 11 and 12. Note that FIG. 10 which is a time chart for use to read main data written on the memory card 20 is different from the time chart shown in FIG. 6 in the contents of the busy signal and the ready signal. FIG. 11 is a flow chart of a process which is performed by the data processing apparatus 10 when main data written on the memory card 20 is read. FIG. 12 is a flow chart of a process which is performed by the memory card 20 when main data written on the memory card 20 is read.

Figure 10:
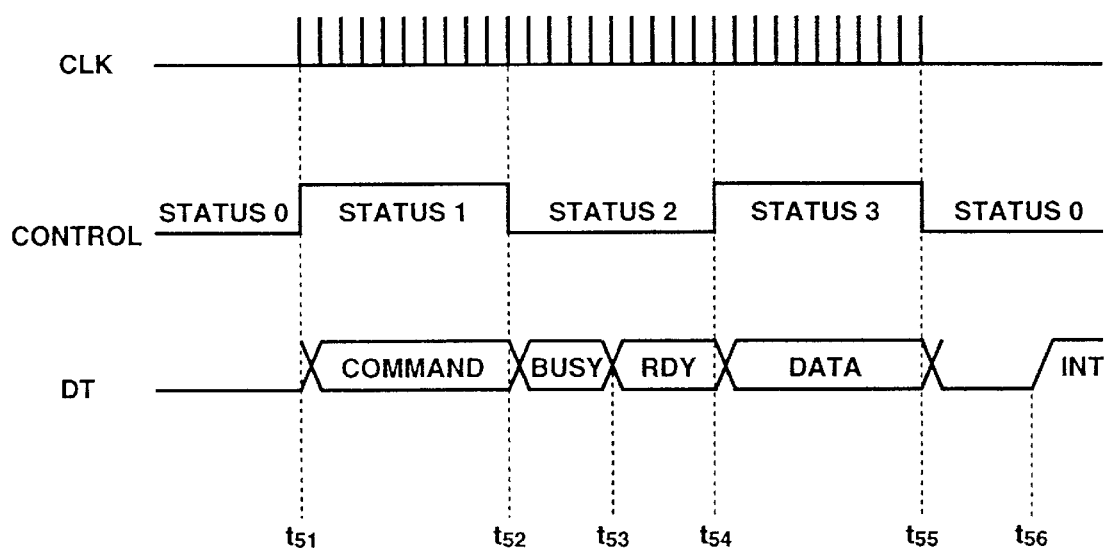
FIG. 10 is a time chart of data which is communicated between the data processing apparatus and the memory card.
Figure 11:
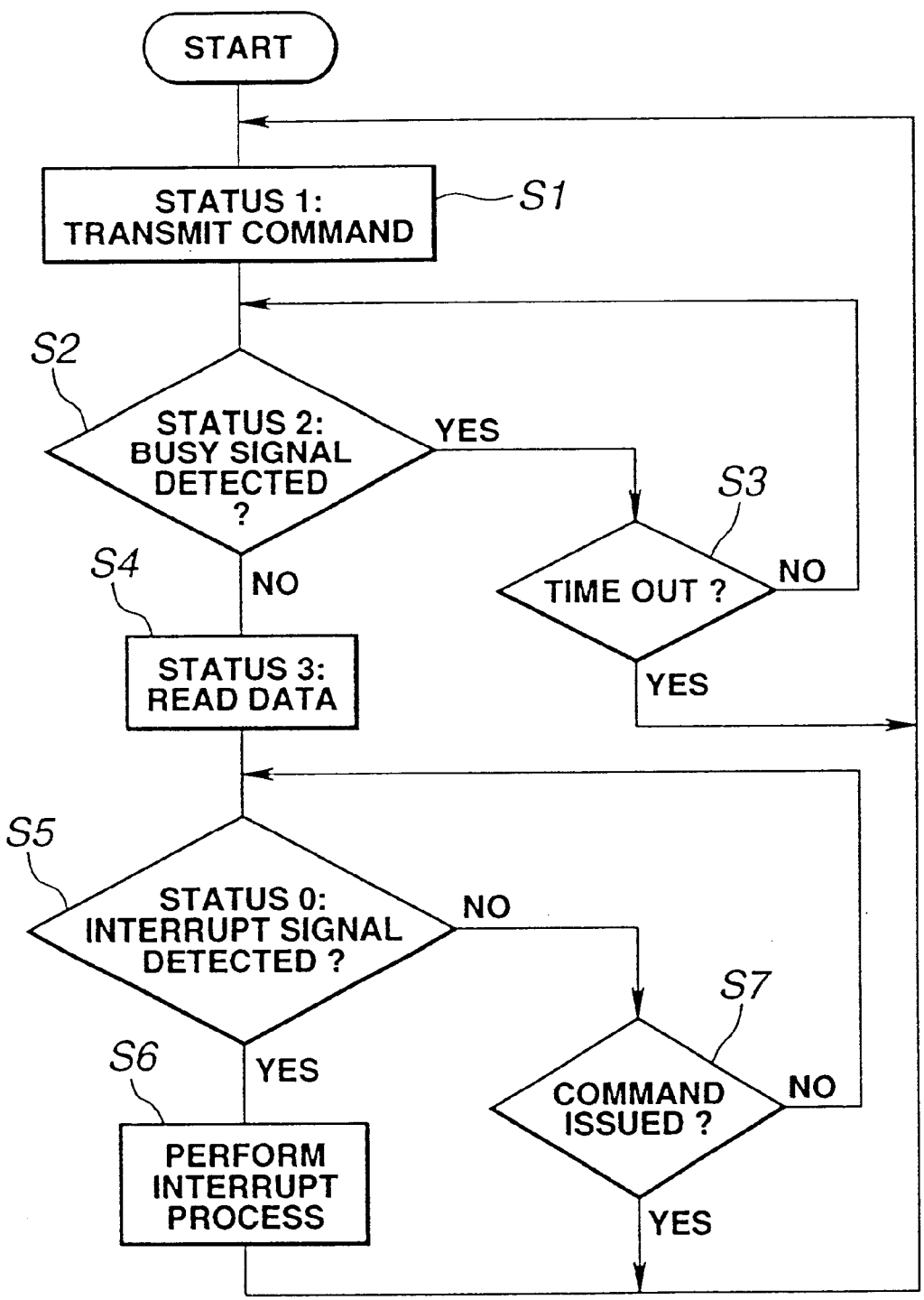
FIG. 11 is a flow chart of a process which is performed by the data processing apparatus when data is read from the memory card.
Figure 12:
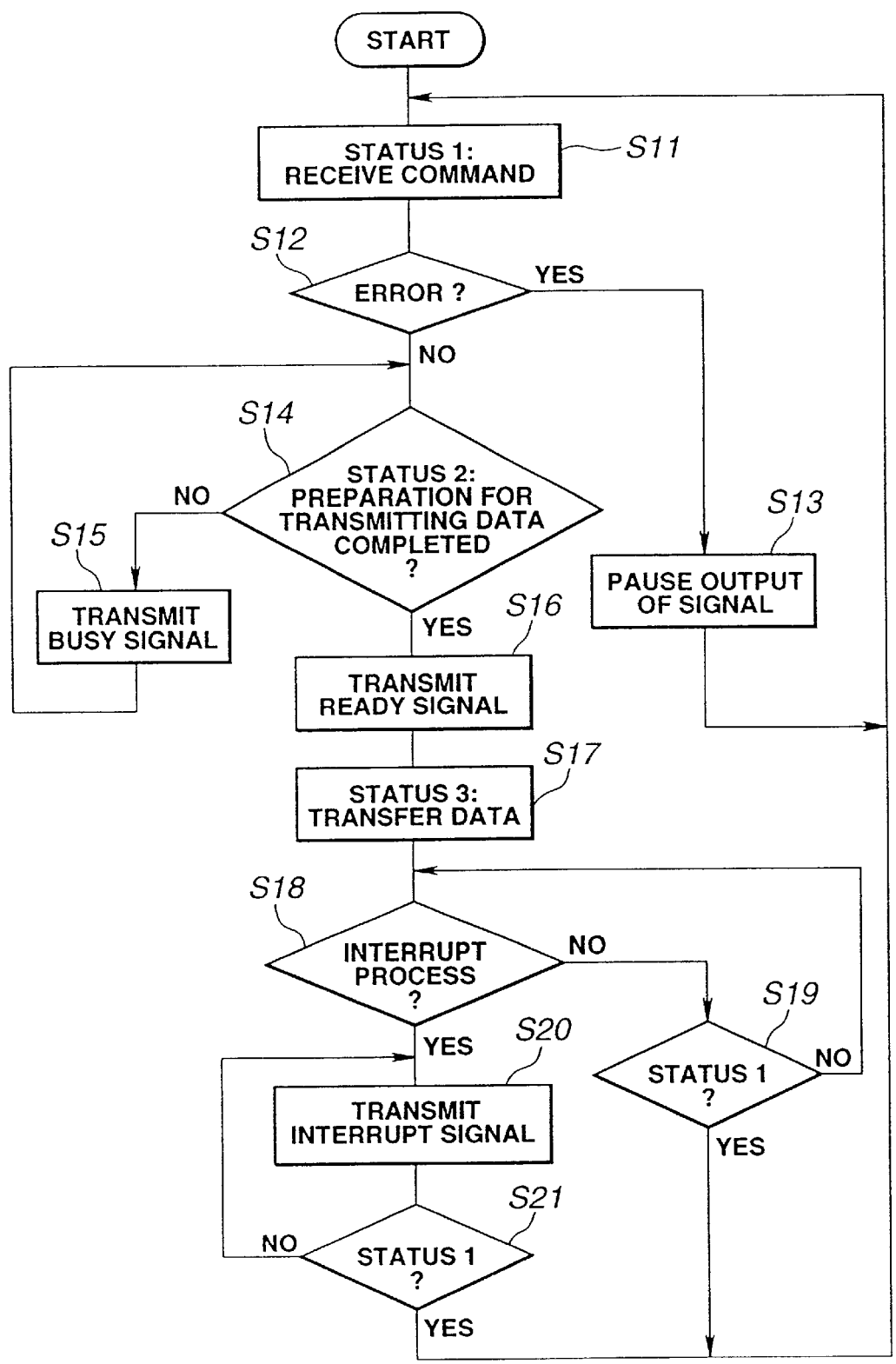
FIG. 12 is a flow chart of a process which is performed by the memory card when data is read from the memory card.

Referring to FIGS. 10 and 11, the process which is performed by the data processing apparatus 10 will now be described.

When main data is read from the memory card 20, the data processing apparatus 10 initially writes, on the register 12, a reading command which is a command to read main data from the memory card 20. In step S1 the data processing apparatus 10 is controlled by the host side controller 14 so that the data processing apparatus 10 makes the signal level of the control signal which is transmitted from the host side serial interface circuit 13 to be a high level so that "STATUS 1" is realized (at time $t_{s1}$ shown in FIG. 10). When the state is "STATUS 1", the data processing apparatus 10 reads a reading command from the register 12 to supply the reading command to the host side serial interface circuit 13. Then, the data processing apparatus 10 adds an error correction code and the like to the reading command so as to transmit the reading command to the memory card 20 through the DT line 33.

After the reading command has been transmitted, the data processing apparatus 10 is controlled by the host side controller 14 so that the data processing apparatus 10 makes the signal level of the control signal which is transmitted from the host side serial interface circuit 13 to be a low level so as to realize "STATUS 2" (at time $t_{s2}$ shown in FIG. 10). When the state is "STATUS 2", the data processing apparatus 10 detects the status signal transmitted from the memory card 20. In step S2 the data processing apparatus 10 makes a determination whether or not the busy signal has been detected.

If the signal transmitted through the DT line 33 is a signal (hereinafter called as a "DC signal") having the signal level which is not changed particularly, the host side serial interface circuit 13 makes a determination that the DC signal is a busy signal indicating a state in which the memory card 20 does not receive any signal input. If the signal transmitted through the DT line 33 is a signal (hereinafter called as an "AC signal") having the signal level which is repeatedly changed at predetermined cycles, the host side serial interface circuit 13 makes a determination that the signal is a ready signal indicating a fact that the memory card 20 is in a signal waiting state.

At this time, the host side serial interface circuit 13 simply makes a determination whether the signal transmitted through the DT line 33 is the DC signal or the AC signal. When a signal having a constant level is transmitted from the memory card 20, the host side serial interface circuit 13 detects the signal as the busy signal. Moreover, the host side serial interface circuit 13 also makes a determination that the status signal is the busy signal in a period of time in which the memory card 20 pauses signal output.

If the busy signal is detected in step S2, the operation proceeds to step S3. In step S3 the data processing apparatus 10 makes a determination whether or not the busy signal has been continued for predetermined period of time. If the busy signal is continued for predetermined period of time, the data processing apparatus 10 makes a determination that time out has taken place. Then, the operation is returned to step S1 so that the data processing apparatus 10 repeats the operation. That is, if the busy signal is continued for a period of time not shorter than a predetermined period of time, the data processing apparatus 10 makes a determination that an error of some kind has been made in the memory card 20. Thus, the data processing apparatus 10 returns the state to "STATUS 1" so that the data processing apparatus 10 again transmits the reading command.

If the period of time in which the busy signal is continued is shorter than a predetermined period of time, the operation is returned to step S2 so that the process is repeated. That is, the data processing apparatus 10 repeats steps S2 and S3 until the status signal supplied from the memory card 20 is changed from the busy signal to the ready signal.

Note that the memory card 20 is arranged to pause an output of a signal when an error of some kind has been made. Since the resistor 33a serving as the so-called pull-down resistor is connected to the DT line 33, the signal level of the DT line 33 is made such that a low signal level is maintained when the previous signal level is the low level. When the previous signal level is a high level, the signal level is gradually changed to the low level. Any one of the foregoing states is, by the data processing apparatus 10, detected as the DC signal, that is, a busy signal. That is, if an error is made in the memory card 20, transmission of the busy signals is continued. Therefore, if an error is made in the memory card 20, the error can be detected in accordance with determination made in steps S2 and S3.

That is, the data processing apparatus 10 and memory card 20 according to this embodiment have the structures that any special signal indicating generation of an error is not transmitted from the memory card 20 to the data processing apparatus 10 if an error is made in the memory card 20. The generation of the error can be detected by the data processing apparatus 10.

If no error is made in the process which is performed by the memory card 20, that is, if the process is normally completed, the memory card 20 is brought to a state in which the memory card 20 is able to receive input of a signal from outside. In this state, the status signal which is transmitted from the memory card 20 is changed from the busy signal to the ready signal (at time $t_{s3}$ shown in FIG. 10). The ready signal is the AC signal having the signal level which is repeatedly changed at predetermined cycles. It is preferable that the ready signal is a signal having the signal level which is changed at a frequency not higher than the frequency of the synchronizing signal so as to be quickly and reliably detected by the data processing apparatus 10. Specifically, a signal is employed, the signal level of which is changed between the high level and the low level at a frequency which is half of the synchronizing signal.

When no busy signal is detected in step S2, that is, when the ready signal is detected, the operation proceeds to step S4. In step S4 the data processing apparatus 10 is controlled by the host side controller 14 so that the data processing apparatus 10 makes the signal level of the control signal which is transmitted from the host side serial interface circuit 13 to be a high level to realize "STATUS 3" (at time $t_{54}$ shown in FIG. 10). When the state is "STATUS 3", the data processing apparatus 10 receives main data read from the memory card 20 by the host side serial interface circuit 13 thereof. Main data received by the host side serial interface circuit 13 is transferred to the data processing block 11 through the register 12 because of the control performed by the host side controller 14.

After receipt of main data read from the memory card 20 has been completed, the data processing apparatus 10 makes the signal level of the control signal which is transmitted from the host side serial interface circuit 13 to be the low level so that "STATUS 0" is realized (at time $t_{55}$ shown in FIG. 10) because of the control performed by the host side controller 14.

Then, the data processing apparatus 10 makes a determination in step S5 whether or not the interrupt signal has been detected. The interrupt signal is a signal indicating a fact the memory card 20 requires an interruption process of some kind. If the interrupt signal is detected, the operation proceeds to step S6 (at time $t_{56}$ shown in FIG. 10). In step S6 the data processing apparatus 10 transmits the detected interrupt signal to the data processing block 11. Then, the data processing apparatus 10 performs the interruption process corresponding to the detected interrupt signal by returning the process to step S1 so that the data processing apparatus 10 repeats the process.

If no interrupt signal is detected in step S5, the operation proceeds to step S7. In step S7 the data processing apparatus 10 makes a determination whether or not the data processing apparatus 10 must perform any process for the memory card 20. That is, the data processing apparatus 10 makes a determination whether or not there is a command which must be issued to the memory card 20. If no command must be issued to the memory card 20, the process is returned to step S5 so that the data processing apparatus 10 repeats the process. If there is a command which must be issued to the memory card 20, the process is returned to step S1 so that the data processing apparatus 10 repeats the process which is started by transmitting the command. That is, if a request for the memory card 20 to perform a process of some kind is made, for example, if a request to perform a process for detecting the internal status of the memory card 20 is made before the interrupt signal is generated, the operation is returned to step S1 so that the command corresponding to the process is issued.

Referring to FIGS. 10 and 12, the process which must be performed by the memory card 20 will now be described.

When main data is read by the data processing apparatus 10, the memory card 20, in step S11, receives data transmitted from the host side serial interface circuit 13 through the DT line 33 as a command (at time $t_{51}$ shown in FIG. 10). Note that data is received by the memory card 20 as the command when the signal level of the control transmitted from the host side serial interface circuit 13 is the high level and the memory card 20 recognizes that the present state is "STATUS 1". After data transmission from the data processing apparatus 10 has been completed, the signal level of the control signal is switched from the low level to the high level.

In step S12 whether or not an error has been made when the command has been received in step S11 is determined. The error is made when, for example, the transmitted data is not the command because, for example, the memory card 20 recognizes that the state is "STATUS 1" and the data processing apparatus 10 recognizes that the state is "STATUS 3".

If an error is made when the command is received, the operation proceeds to step S13 so that the output of the signal from the memory card 20 is paused. Then, the operation is returned to step S11 so that a state for waiting for re-input of the command from the data processing apparatus 10 is realized. That is, the card side serial interface circuit 23 pauses the signal output if an error is made during receipt of the command from the host side serial interface circuit 13. Note that the data processing apparatus 10 is brought to a state for detecting a busy signal in a period of time in which the signal output from the memory card 20 is paused.

If no error is made during the receipt of the command, the state is shifted to "STATUS 2" (at time $t_{52}$ shown in FIG. 10). Then, the operation proceeds to step S14 so that the memory card 20 performs the process corresponding to the command received in step S11. Moreover, the memory card 20 makes a determination whether or not the preparation for transmitting main data to the data processing apparatus 10 has been completed. If the preparation is not completed, the operation proceeds to step S15. After the preparation has been completed, the operation proceeds to step S16.

In step S15 the card side serial interface circuit 23 transmits a busy signal having a constant signal level. Then, the operation is returned to step S14 so that the card side serial interface circuit 23 makes a determination whether or not the preparation for transmitting main data to the data processing apparatus 10 has been completed. The card side serial interface circuit 23 repeats the above-mentioned processes. That is, the card side serial interface circuit 23 continuously transmits the busy signal having the constant signal level until the preparation for transmitting main data to the data processing apparatus 10 is completed.

When the preparation for transmitting main data to the data processing apparatus 10 has been completed, the operation proceeds to step S16 so that the card side serial interface circuit 23 transmits the ready signal to the host side serial interface circuit 13 (at time $t_{53}$ shown in FIG. 10). As described above, the ready signal is the signal having the frequency which is half of the frequency of the synchronizing signal.

When the ready signal has been detected by the data processing apparatus 10, the signal level of the control signal is switched from the low level to the high level. That is, the state is switched from "STATUS 2" to "STATUS 3" (at time $t_{54}$ shown in FIG. 10). When "STATUS 3" has been realized, the card side controller 24, in step S17, transmits main data, which has been instructed to be read with the command received in step S11, to the host side serial interface circuit 13 through the card side serial interface circuit 23 and the DT line 33 The transmission of main data is performed in synchronization with the synchronizing signal transmitted through the CLK line 31. After all of the main data items have been received by the data processing apparatus 10, the signal level of the control signal is switched from the high level to the low level. That is, the state is switched from "STATUS 3" to "STATUS 0" (at time $t_{55}$ shown in FIG. 10).

In step S18 the card side controller 24 makes a determination whether or not there is a request to perform an interruption of some kind. If no request for an interruption is made, the operation proceeds to step S19. If a request for performing an interruption is made, the operation proceeds to step S20.

In step S19 the card side controller 24 makes a determination whether or not the signal level of the control signal supplied from the host side serial interface circuit 13 has been switched from the low level to the high level, that is, whether or not the state has been switched from "STATUS 0" to "STATUS 1". If the state is switched to "STATUS 1", the operation is returned to step S11 so that the process is repeated by initially receiving the command If "STATUS 0" is maintained, the operation is returned to step S18 so that the process is repeated. That is, the memory card 20 repeats steps S18 and S19 until the interruption process is required or the state is switched from "STATUS 0" to "STATUS 1".

If a determination is made in step S18 that a request for performing an interruption process is made, the card side serial interface circuit 23, in steps S20 and S21, transmits the interrupt signal until the state is switched from "STATUS 0" to "STATUS 1". If the interrupt signal is detected by the memory card 20, the signal level of the control signal supplied from the host side serial interface circuit 13 is switched from the low level to the high level so that the state is switched from "STATUS 0" to "STATUS 1". After the state has been switched from "STATUS 0" to "STATUS 1", the operation is returned to step S11 so that the memory card 20 repeats the process which is started by receiving the command. Note that the command is received with which the process corresponding to the interrupt signal transmitted in step S20 is performed.

As described above, the signal which is transmitted during a period in which the memory card 20 is performing a process is made to be the busy signal. Moreover, also a state in which no signal output is produced from the memory card 20 is detected as the busy signal. Therefore, an undesirable process for transmitting data which is performed while the memory card 20 incorrectly determines the state cannot be performed. Therefore, conflict of data transmitted from the memory card 20 with data transmitted from the data processing apparatus 10 with each other can be prevented. Moreover, incorrect data communication between the memory card 20 and the data processing apparatus 10 can be prevented. In addition, undesirable inhibition of data communication can be prevented which takes place because both of the memory card 20 and the data processing apparatus 10 are brought to the waiting state.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. Data processing apparatus, comprising:
   a serial signal I/O block for transmitting to an external storage device serial signals as control commands for controlling the operation of said external storage device, for receiving serial signals from said external storage device indicative of an operation state of said external storage device, for transmitting to and receiving from said external storage device serial signals as data to be written to and read from said external storage device and for receiving from said external storage device interrupt signals;
   a control signal output for supplying to said external storage device a control signal for controlling timing at which data communicated by said serial signal I/O block is switched; and
   a synchronizing signal output for supplying to said external storage device a synchronizing signal for the data communicated by said serial signal I/O block.

2. The data processing apparatus of claim 1, wherein said data processing apparatus determines that an error has occurred in a process performed by said external storage apparatus when said serial signal I/O block has continuously received busy signals for at least a predetermined period of time.

3. The data processing apparatus of claim 1, wherein said data processing apparatus writes data to said external storage apparatus in such a manner that said serial signal 110 block transmits a control command for writing data to said external storage apparatus, followed by transmitting the data to be written to said external storage apparatus and followed by receiving a status signal from said external storage apparatus.

4. The data processing apparatus of claim 3, wherein said data processing apparatus writes data to said external storage apparatus in such a manner that said serial signal I/O again transmits a control command for writing data to said external storage apparatus.

5. The data processing apparatus of claim 1, wherein said data processing apparatus reads data from the said external storage apparatus in such a manner that said serial signal I/O block transmits a control command for reading data followed by receiving said status signal from said external storage apparatus, whereupon the data read from said external storage apparatus is received when said status signal changes to a ready signal.

6. The data processing apparatus of claim 5, wherein said data processing apparatus reads data from said external storage apparatus in such a manner that said serial signal I/O block again transmits a control command for reading data from said external storage apparatus when said serial signal I/O block has continuously received busy signals for at least a predetermined period of time.

7. The data processing apparatus of claim 5, wherein said ready signal changes its level at a frequency not higher than the frequency of said sychronizing signal.

8. The data processing apparatus of claim 1, wherein a resistor having a grounded end is connected to said serial signal I/O block, and said serial signal I/O block produces an output of predetermined level in accordance with the resistance value of said resistor when a signal is not communicated between said serial signal I/O block and said external storage apparatus.

9. An external storage device controlled in accordance with a control command supplied thereto from data processing apparatus which writes data to or reads data from said external storage device, comprising:
   a serial signal I/O block communicating with said data processing apparatus by serial signals for receiving said control command, for transmitting to said data processing apparatus a status signal indicative of an operation state of said external storage device, for transmitting to and receiving from said data processing apparatus data read from and written to said external storage device, and for transmitting to said data processing apparatus interrupt signals;
   a control signal input for receiving from said data processing apparatus a control signal for controlling timing at which data communicated by said serial signal I/O block is switched; and a synchronizing signal input for receiving from said data processing apparatus a synchronizing signal for the data communicated by said serial signal I/O block.

10. The external storage apparatus of claim 9, wherein said serial signal I/O block pauses the output of a signal and waits for the input of a Previously submitted control command when an error has occurred during receipt of a control command.

11. The external storage apparatus of claim 9, wherein said status signal has a level that changes at a frequency not higher than the frequency of said synchronizing signal.

12. A data processing system, comprising:
 data processing apparatus, including:
  a first serial signal I/O block for communicating with an external storage device by serial signals including a control command transmitted for controlling the operation of said external storage device, for receiving a status signal from said external storage device indicative of an operation state of said external storage device, for transmitting to and receiving from said external storage device data to be written to and read from said external storage device and for receiving from said external storage device interrupt signals;
  a control signal output for supplying to said external storage device a control signal for controlling timing at which data communicated by said first serial signal I/O block is switched; and
  a synchronizing signal output for supplying to said external storage device a synchronizing signal for the data communicated by said first serial signal I/O block; and
 said external storage device including:
  a second serial signal I/O block communicating with said data processing apparatus by serial signals for receiving said control command, for transmitting to said data processing apparatus said status signal, for transmitting to and receiving from said data processing apparatus data read from and written to said external storage device, and for transmitting to said data processing apparatus said interrupt signals;
  a control signal input for receiving from said data processing apparatus a control signal for controlling timing at which data communicated by said second serial signal I/O block is switched; and
  a synchronizing signal input for receiving from said data processing apparatus a synchronizing signal for the data communicated by said second serial signal I/O block.

13. The data processing system of claim 12, wherein said data processing apparatus determines that the received status signal is a ready signal indicating that said external storage apparatus is awaiting input of a signal when the level of said status signal changes repeatedly at predetermined cycles, and wherein said data processing apparatus determines that the received status signal is a busy signal indicating that said external storage apparatus does not receive input of a signal.

14. The data processing system of claim 13, wherein said data processing apparatus determines that an error has occurred in a process performed by said external storage apparatus when said first serial signal I/O block has continuously received busy signals for at least a predetermined period of time.

15. A method of communicating data between data processing apparatus and an external storage device, comprising the steps of:
 communicating between a first serial signal I/O block and said external storage device by serial signals including a control command transmitted for controlling the operation of said external storage device, receiving a status signal from said external storage device indicative of an operation state of said external storage device, transmitting to and receiving from said external storage device data to be written to and read from said external storage device and receiving from said external storage device interrupt signals;
 supplying to said external storage device a control signal for controlling timing at which data communicated by said first serial signal I/O block is switched;
 supplying to said external storage device a synchronizing signal for the data communicated by said first serial signal I/O block;
 communicating between a second serial signal I/O block and said data processing apparatus by serial signals including receiving said control command, transmitting to said data processing apparatus said status signal, transmitting to and receiving from said data processing apparatus data read from and written to said external storage device, and transmitting to said data processing apparatus said interrupt signals;
 receiving from said data processing apparatus a control signal for controlling timing at which data communicated by said second serial signal I/O block is switched; and
 receiving from said data processing apparatus a synchronizing signal for the data communicated by said second serial signal I/O block.

16. The data transmitting method of to claim 15, wherein said data processing apparatus determines that the received status signal is a ready signal indicating that said external storage apparatus is awaiting input of a signal when the level of said status signal changes repeatedly at predetermined cycles, and wherein said data processing apparatus determines that the received status signal is a busy signal indicating that said external storage apparatus does not receive input of a signal.

17. The data transmitting method of claim 16, wherein said data processing apparatus determines that an error has occurred in a process performed by said external storage apparatus when said first serial signal I/O block has continuously received busy signals for at least a predetermined period of time.

* * * * *